United States Patent
Dansie et al.

(10) Patent No.: US 11,953,199 B2
(45) Date of Patent: Apr. 9, 2024

(54) BURNER AND BURNER SYSTEM WITH FLANGE MOUNT

(71) Applicant: CLEARSIGN TECHNOLOGIES CORPORATION, Tulsa, OK (US)

(72) Inventors: James K. Dansie, Renton, WA (US); Douglas W. Karkow, Mount Vernon, IA (US); Jesse Dumas, Seattle, WA (US); Donald Kendrick, Bellevue, WA (US); Sunny Karnani, Silver Spring, MD (US); Christopher A. Wiklof, Everett, WA (US)

(73) Assignee: ClearSign Technologies Coporation, Tulsa, OK (US)

( * ) Notice: Subject to any disclaimer, the term of this patent is extended or adjusted under 35 U.S.C. 154(b) by 0 days.

(21) Appl. No.: 17/658,248

(22) Filed: Apr. 6, 2022

(65) Prior Publication Data

US 2022/0299203 A1  Sep. 22, 2022

Related U.S. Application Data

(63) Continuation of application No. 16/033,854, filed on Jul. 12, 2018, now Pat. No. 11,313,553, which is a
(Continued)

(51) Int. Cl.
  *F23D 11/40* (2006.01)
  *F23D 14/14* (2006.01)
(Continued)

(52) U.S. Cl.
CPC ............ *F23D 11/406* (2013.01); *F23D 14/14* (2013.01); *F23D 14/145* (2013.01); *F23D 14/70* (2013.01);
(Continued)

(58) Field of Classification Search
CPC .. F23D 11/406; F23D 14/70; F23D 2203/102; F23D 2203/104; F23C 2203/10; F23C 2203/20; F23M 9/06
(Continued)

(56) References Cited

U.S. PATENT DOCUMENTS 2,095,065 A    10/1935  Hays
2,828,813 A    4/1958   Holden
(Continued)

FOREIGN PATENT DOCUMENTS

CN    101046304    10/2007
EP    0866296      9/1998
(Continued)

OTHER PUBLICATIONS

PCT International Search Report and Written Opinion mailed Jun. 13, 2017 for International PCT Application No. PCT/ US2017/ 013523 filed Jan. 13, 2017.
(Continued)

*Primary Examiner* — Ko-Wei Lin
(74) *Attorney, Agent, or Firm* — Launchpadip, Inc.; Christopher A. Wiklof; Harold H. Bennett, II

(57) ABSTRACT

A combustion system includes a fuel and oxidant source that outputs fuel and oxidant, a first perforated flame holder, and a second perforated flame holder separated from the first perforated flame holder by a gap. The first and second perforated flame holders sustain a combustion reaction of the fuel and oxidant within the first and second perforated flame holders.

38 Claims, 22 Drawing Sheets

Related U.S. Application Data continuation of application No. PCT/US2017/013523, filed on Jan. 13, 2017.

(60) Provisional application No. 62/411,374, filed on Oct. 21, 2016, provisional application No. 62/394,110, filed on Sep. 13, 2016, provisional application No. 62/278,350, filed on Jan. 13, 2016.

(51) Int. Cl.
  *F23D 14/70* (2006.01)
  *F23M 9/06* (2006.01)

(52) U.S. Cl.
  CPC ............ *F23M 9/06* (2013.01); *F23C 2203/10* (2013.01); *F23C 2203/20* (2013.01); *F23D 2203/102* (2013.01); *F23D 2203/104* (2013.01); *Y02E 20/30* (2013.01)

(58) Field of Classification Search
  USPC .................................................. 431/350–353
  See application file for complete search history.

(56) References Cited

U.S. PATENT DOCUMENTS

| | | | |
|---|---|---|---|
| 3,008,513 A | 11/1961 | Holden | |
| 32,228,614 | 1/1966 | Bauer | |
| 3,324,924 A | 6/1967 | Hailstone et al. | |
| 3,439,996 A | 4/1969 | Lherault et al. | |
| 3,661,499 A * | 5/1972 | Krieger | F23D 14/145 431/328 |
| 3,721,538 A * | 3/1973 | Okuma, et al. | C03B 37/065 65/528 |
| 3,890,088 A * | 6/1975 | Ferri | F23R 3/32 60/737 |
| 4,021,188 A | 5/1977 | Yamagishi et al. | |
| 4,397,356 A | 8/1983 | Retallick et al. | |
| 4,408,461 A | 10/1983 | Bruhwiler et al. | |
| 4,473,349 A | 9/1984 | Kumatsu | |
| 4,483,673 A | 11/1984 | Murai et al. | |
| 4,519,770 A | 5/1985 | Kesselring et al. | |
| 4,588,373 A | 5/1986 | Tonon et al. | |
| 4,643,667 A | 2/1987 | Fleming | |
| 4,652,236 A | 3/1987 | Viessmann | |
| 4,673,349 A | 6/1987 | Abe et al. | |
| 4,726,767 A | 2/1988 | Nakajima | |
| 4,752,213 A | 6/1988 | Grochowski et al. | |
| 4,773,847 A | 9/1988 | Shukla et al. | |
| 4,856,492 A | 7/1989 | Berjerklie | |
| 4,906,180 A | 3/1990 | Dvorak | |
| 5,248,255 A | 9/1993 | Morioka et al. | |
| 5,326,257 A | 7/1994 | Taylor et al. | |
| 5,375,999 A | 12/1994 | Aizawa et al. | |
| 5,409,374 A | 4/1995 | Butcher | |
| 5,439,372 A | 8/1995 | Duret et al. | |
| 5,441,402 A | 8/1995 | Reulther et al. | |
| 5,511,516 A | 4/1996 | Moore, Jr. et al. | |
| 5,511,974 A | 4/1996 | Gordon et al. | |
| 5,641,282 A | 6/1997 | Lee et al. | |
| 5,667,374 A | 9/1997 | Nutcher et al. | |
| 5,718,573 A | 2/1998 | Knight et al. | |
| 5,957,682 A | 9/1999 | Kamal et al. | |
| 5,993,192 A | 11/1999 | Schmidt et al. | |
| 6,095,798 A | 8/2000 | Mitani et al. | |
| 6,129,545 A | 10/2000 | Kahlke et al. | |
| 6,140,658 A | 10/2000 | Jarvenin | |
| 6,159,001 A | 12/2000 | Kushch et al. | |
| 6,213,757 B1 * | 4/2001 | Kushch | F24H 1/40 126/92 C |
| 6,270,336 B1 | 8/2001 | Terashima et al. | |
| 6,499,990 B1 | 12/2002 | Zink et al. | |
| 6,561,793 B1 | 5/2003 | Narasimhan | |
| 6,997,701 B2 | 2/2006 | Volkert et al. | |
| 7,670,135 B1 | 3/2010 | Zink et al. | |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 9,562,682 B2 | 2/2017 | Karkow et al. | |
| 9,702,547 B2 | 7/2017 | Krichtafovitch et al. | |
| 9,791,171 B2 | 10/2017 | Karkow et al. | |
| 9,797,595 B2 | 10/2017 | Karkow et al. | |
| 9,803,855 B2 | 10/2017 | Karkow et al. | |
| 9,828,288 B2 | 11/2017 | Colannino et al. | |
| 9,857,076 B2 | 1/2018 | Karkow et al. | |
| 9,885,496 B2 | 2/2018 | Karkow et al. | |
| 10,066,833 B2 | 9/2018 | Colannino et al. | |
| 10,066,835 B2 | 9/2018 | Karkow et al. | |
| 10,077,899 B2 | 9/2018 | Karkow et al. | |
| 10,088,153 B2 | 10/2018 | Colannino et al. | |
| 10,088,154 B2 | 10/2018 | Colannino et al. | |
| 11,313,553 B2 * | 4/2022 | Dansie | F23D 14/70 |
| 2003/0054301 A1 | 3/2003 | Borders et al. | |
| 2003/0054313 A1 | 3/2003 | Ratner et al. | |
| 2004/0081933 A1 | 4/2004 | St. Charles et al. | |
| 2006/0084017 A1 | 4/2006 | Huebner et al. | |
| 2007/0020567 A1 | 1/2007 | Branston et al. | |
| 2007/0048685 A1 | 3/2007 | Kuenzler et al. | |
| 2007/0105060 A1 | 5/2007 | Cai et al. | |
| 2008/0124666 A1 | 5/2008 | Stocker et al. | |
| 2008/0268387 A1 | 10/2008 | Saito et al. | |
| 2009/0053664 A1 | 2/2009 | Staller et al. | |
| 2010/0178219 A1 | 7/2010 | Verykios et al. | |
| 2011/0008232 A1 | 1/2011 | Haverty | |
| 2011/0111356 A1 | 5/2011 | Claerbout et al. | |
| 2012/0164590 A1 | 6/2012 | Mach | |
| 2012/0231398 A1 | 9/2012 | Carpentier et al. | |
| 2013/0273485 A1 | 10/2013 | Lenoir et al. | |
| 2014/0227645 A1 | 8/2014 | Kristafovitch et al. | |
| 2014/0227646 A1 | 8/2014 | Kristafovitch et al. | |
| 2015/0010872 A1 | 1/2015 | Schinldet et al. | |
| 2015/0276217 A1 * | 10/2015 | Karkow | F23D 11/383 431/328 |
| 2015/0330625 A1 | 11/2015 | Karkow et al. | |
| 2016/0018103 A1 | 1/2016 | Karkow et al. | |
| 2016/0091200 A1 | 3/2016 | Colannino et al. | |
| 2016/0238240 A1 | 8/2016 | Colannino et al. | |
| 2016/0238242 A1 | 8/2016 | Karkow et al. | |
| 2016/0238277 A1 | 8/2016 | Colannino et al. | |
| 2016/0245509 A1 | 8/2016 | Karkow et al. | |
| 2016/0298838 A1 | 10/2016 | Karkow et al. | |
| 2016/0298840 A1 | 10/2016 | Karkow et al. | |
| 2016/0305660 A1 | 10/2016 | Colannino et al. | |
| 2016/0348899 A1 | 12/2016 | Karkow et al. | |
| 2016/0348900 A1 | 12/2016 | Colannino et al. | |
| 2017/0010019 A1 | 2/2017 | Karkow et al. | |
| 2017/0038063 A1 | 2/2017 | Colannino et al. | |
| 2017/0051913 A1 | 2/2017 | Colannino et al. | |
| 2017/0191655 A1 | 7/2017 | Colannino et al. | |
| 2017/0268772 A1 | 9/2017 | Lang, Sr. et al. | |
| 2017/0307212 A1 | 10/2017 | Kendrick | |
| 2017/0350591 A1 | 12/2017 | Karkow et al. | |
| 2018/0003378 A1 | 1/2018 | Karkow et al. | |
| 2018/0017249 A1 | 1/2018 | Karkow et al. | |
| 2018/0023810 A1 | 1/2018 | Karkow et al. | |
| 2018/0031229 A1 | 2/2018 | Karkow et al. | |
| 2018/0038588 A1 | 2/2018 | Karkow et al. | |
| 2018/0038589 A1 | 2/2018 | Karkow et al. | |
| 2018/0066846 A1 | 3/2018 | Karkow et al. | |
| 2018/0087774 A1 | 3/2018 | Karkow et al. | |
| 2018/0202653 A1 | 7/2018 | Karkow | |

FOREIGN PATENT DOCUMENTS

| | | |
|---|---|---|
| FR | 1151211 | 1/1958 |
| FR | 2503836 | 10/1982 |
| GB | 1015267 | 12/1965 |
| GB | 1042014 | 9/1966 |
| WO | 1995000803 A1 | 1/1995 |
| WO | 2015042614 A1 | 3/2015 |
| WO | 2015054323 A1 | 4/2015 |
| WO | 2015061760 A1 | 4/2015 |
| WO | 2015123149 A2 | 8/2015 |
| WO | 2015123683 A1 | 8/2015 |

(56) References Cited

FOREIGN PATENT DOCUMENTS

| WO | 2015123694 A1 | 8/2015 |
| WO | 2015123696 A1 | 8/2015 |
| WO | 2017124008 A1 | 7/2017 |

OTHER PUBLICATIONS

Schwarzenegger, Arnold, "A Low NOx Porous Ceramics Burner Performance Study," California Energy Commission Public Interest Energy Research Program, Dec. 2007, San Diego State University Foundation.
Howell, J. R., et al., "Combustion of Hydrocarbon Fuels Within Porous Inert Media," Dept. of Mechanical Engineering, The University of Texas, Austin Prog. Energy Combust. Sci. 1996, vol. 22 pp. 121-145.

\* cited by examiner

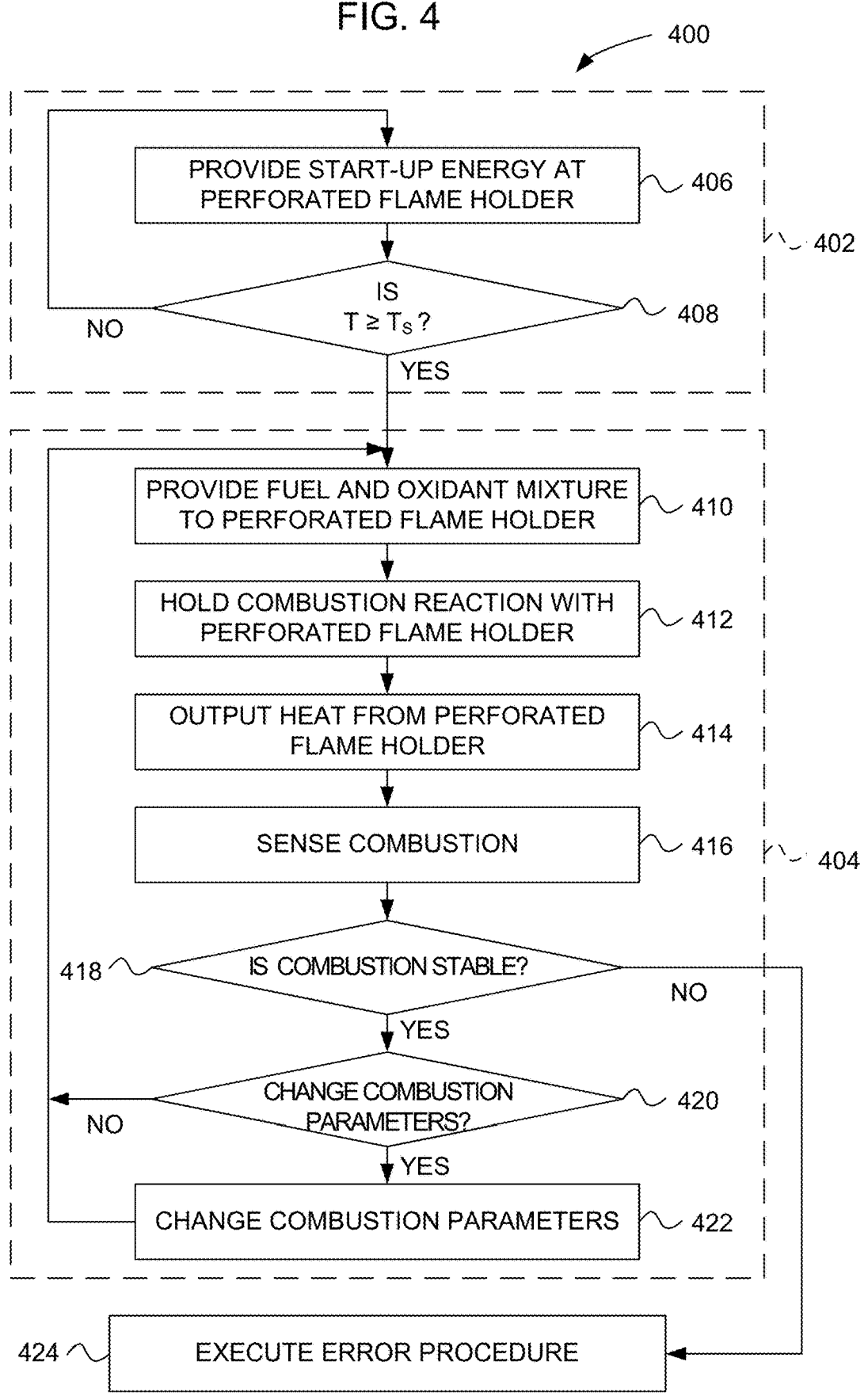

FIG. 6
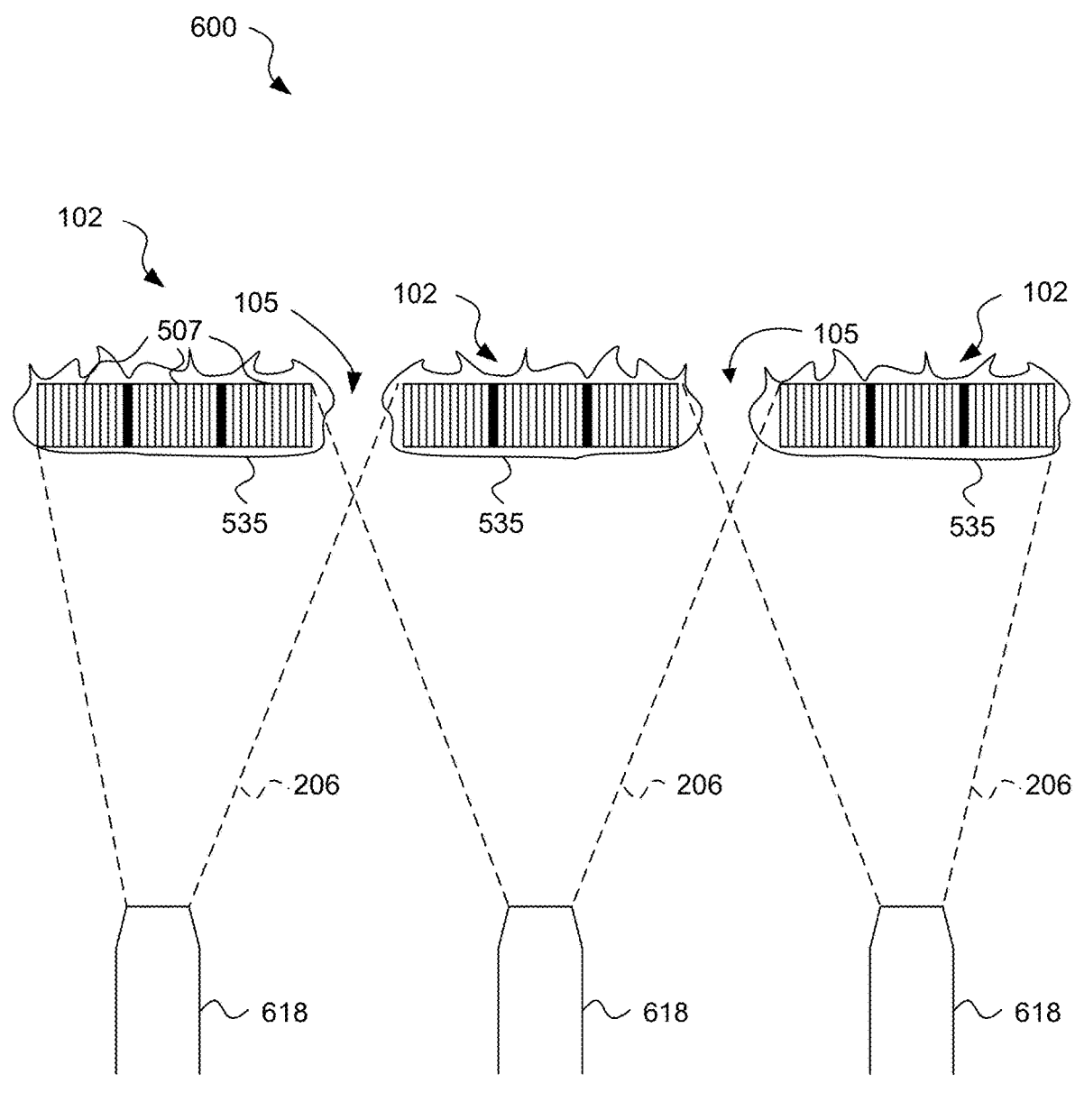
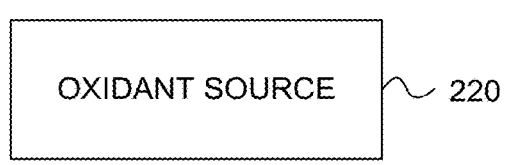

FIG. 9A
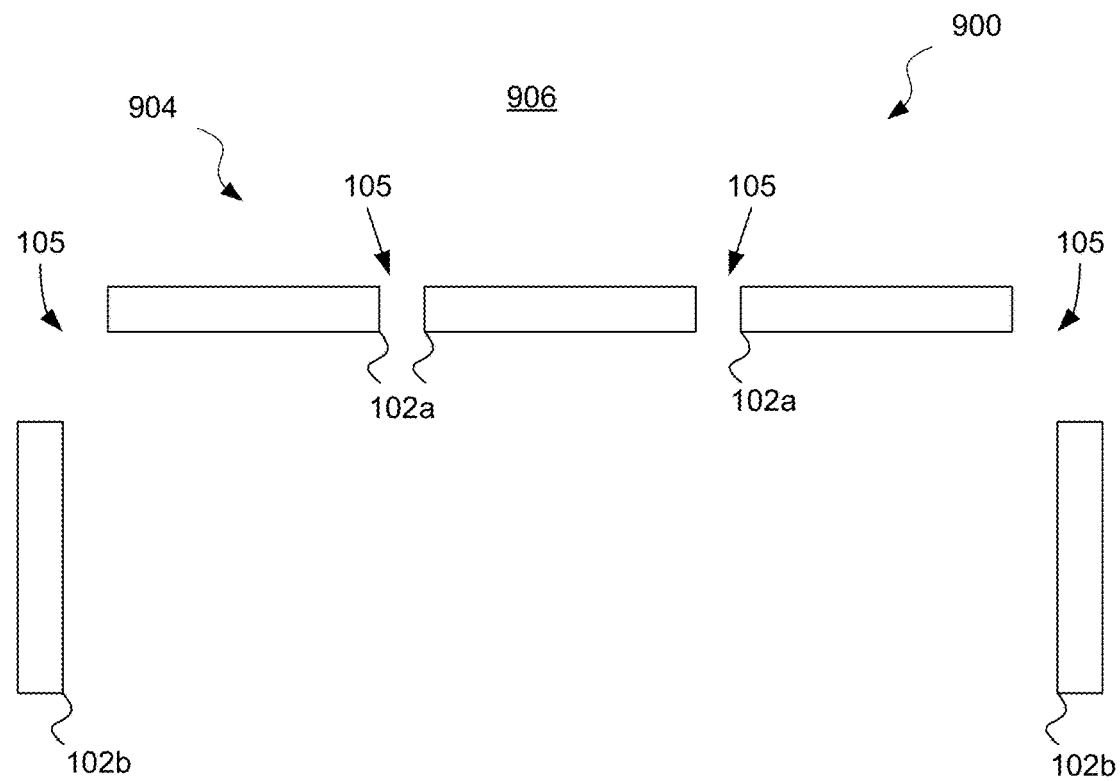
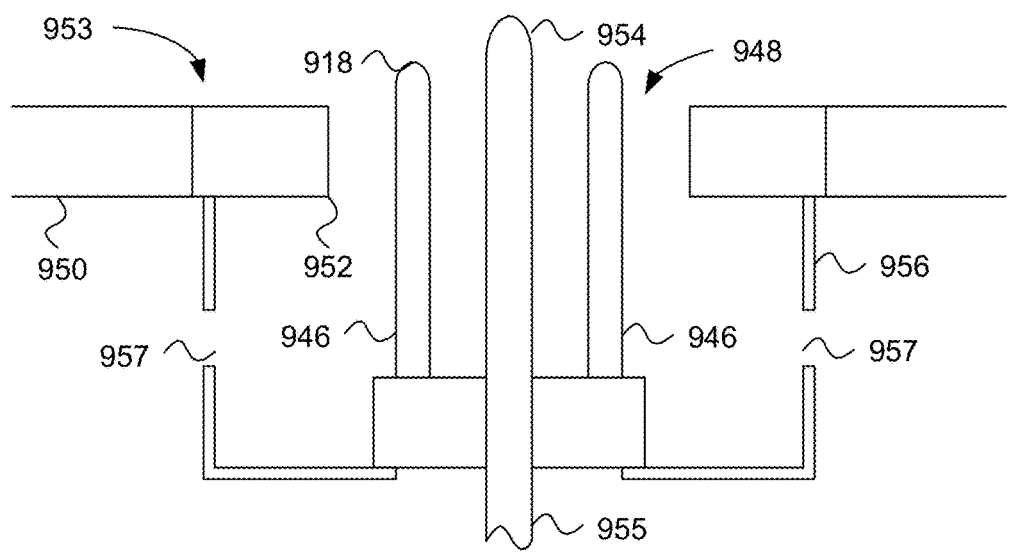

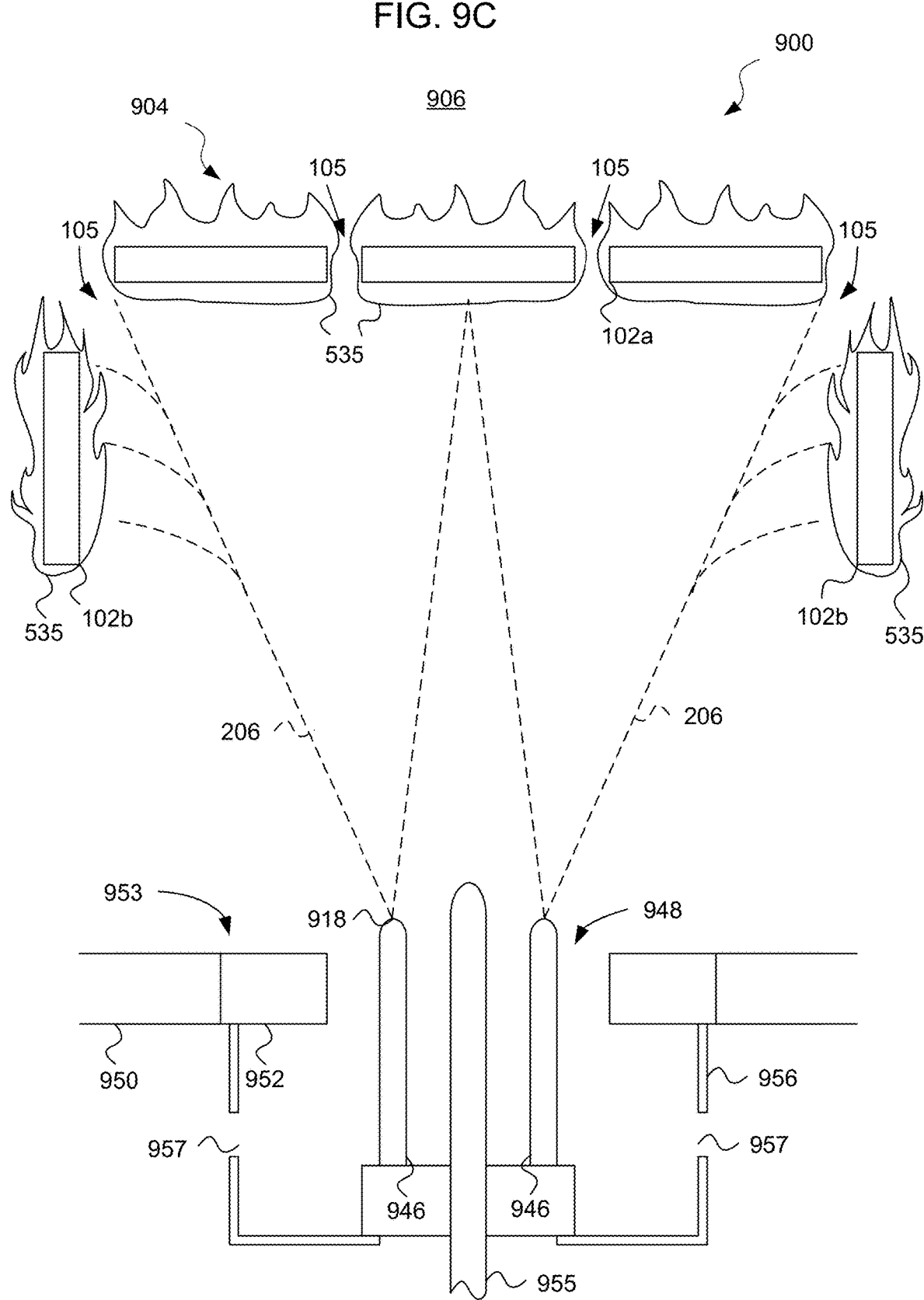

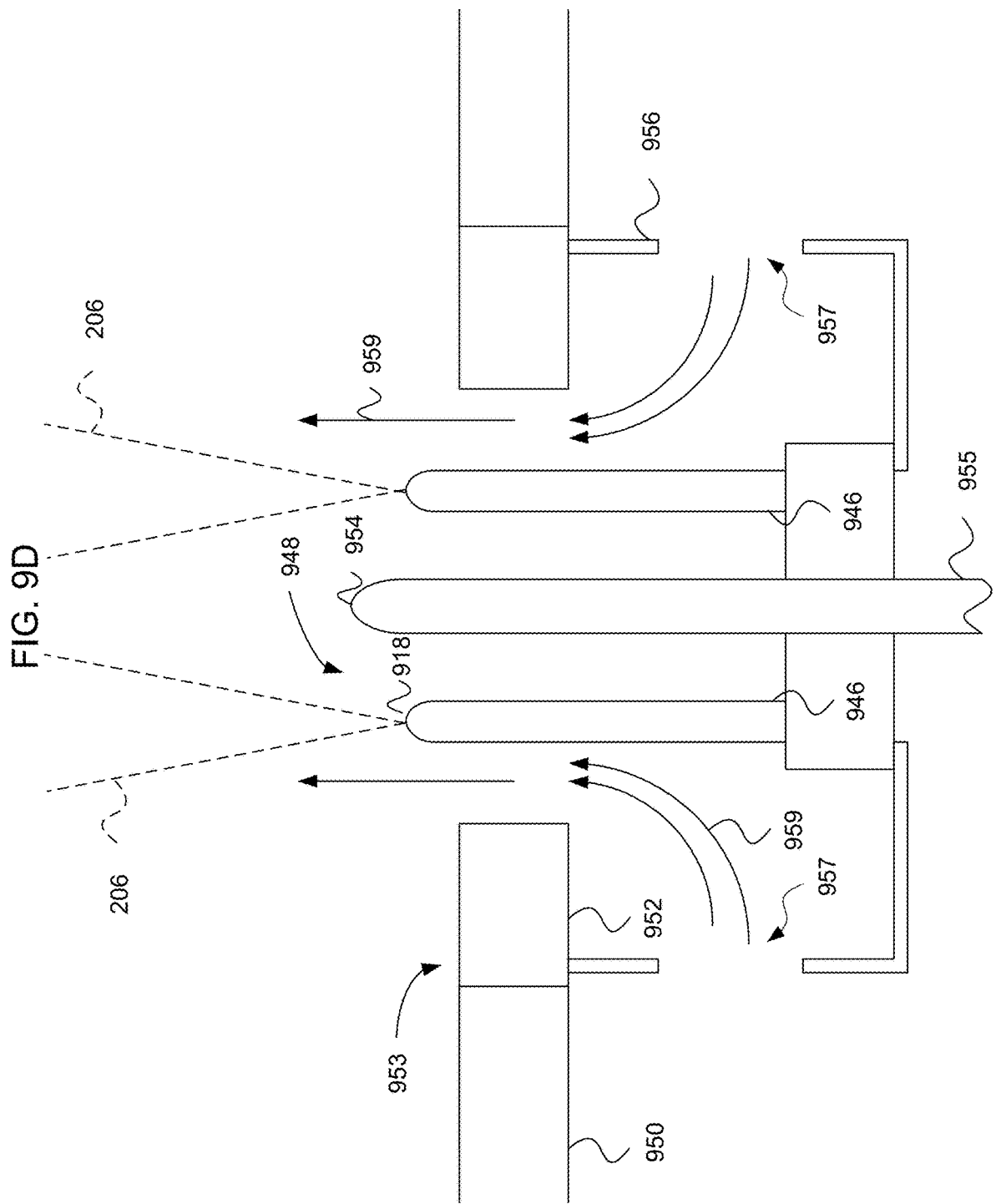

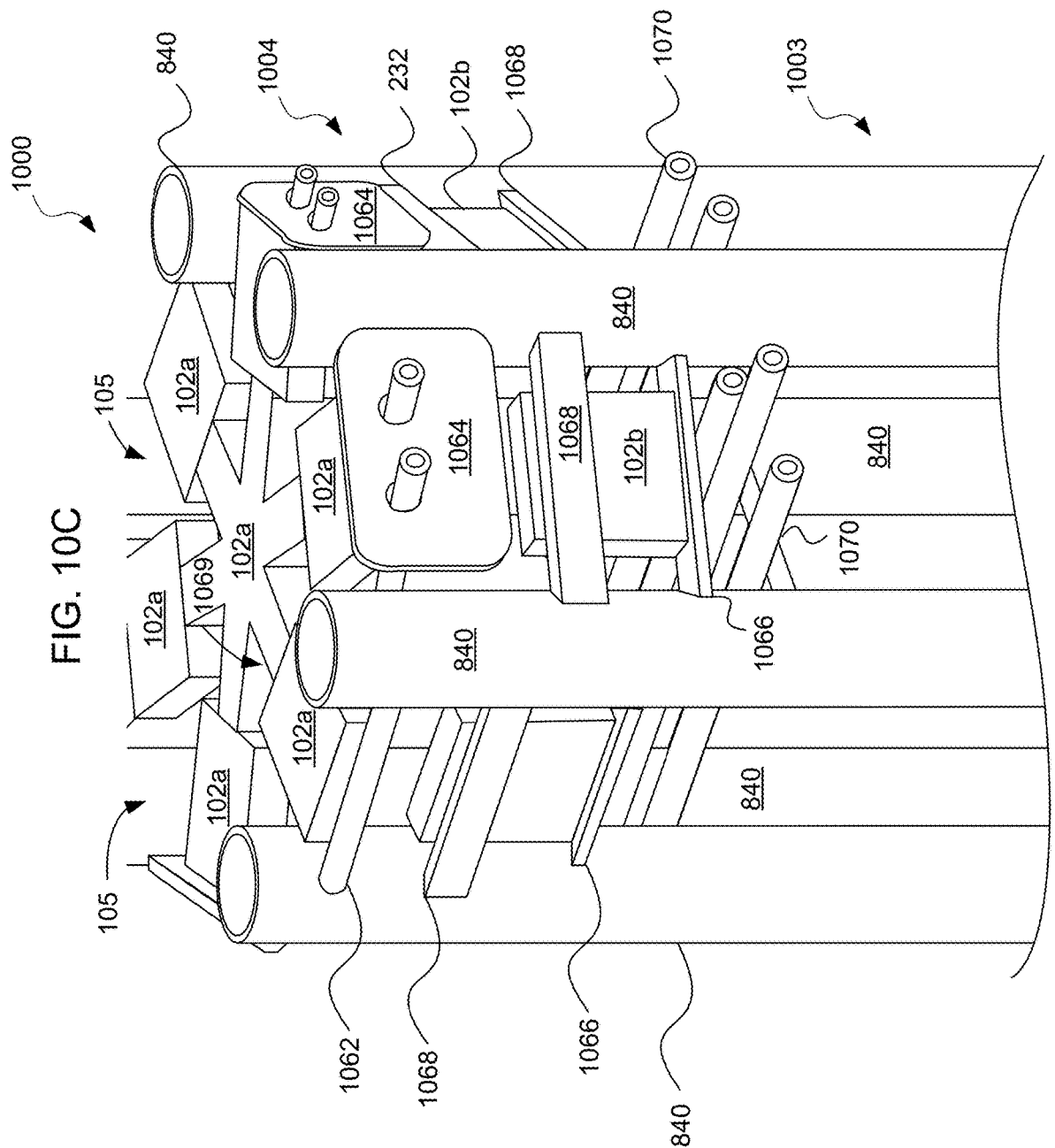

BURNER AND BURNER SYSTEM WITH FLANGE MOUNT

CROSS REFERENCE TO RELATED APPLICATIONS

The present application is a U.S. Continuation application which claims priority benefit from U.S. patent application Ser. No. 16/033,854, entitled "PLUG AND PLAY BURNER," filed Jul. 12, 2018, which claims priority benefit under 35 U.S.C. § 120 of co-pending International Patent Application No. PCT/US2017/013523 entitled "PERFORATED FLAME HOLDER WITH GAPS BETWEEN TILE GROUPS," filed Jan. 13, 2017. Co-pending International Patent Application No. PCT/US2017/013523 claims priority benefit from U.S. Provisional Patent Application No. 62/278,350, entitled "PERFORATED FLAME HOLDER WITH GAPS BETWEEN TILE GROUPS," filed Jan. 13, 2016; U.S. Provisional Patent Application No. 62/394,110, entitled "PLUG AND PLAY BURNER WITH A PERFORATED FLAME HOLDER," filed Sep. 13, 2016; and U.S. Provisional Patent Application No. 62/411,374, entitled "PLUG AND PLAY ENHANCEMENTS," filed Oct. 21, 2016; each of which, of which, to the extent not inconsistent with the disclosure herein, is incorporated by reference.

SUMMARY

According to an embodiment, a combustion system includes a fuel and oxidant source configured to output fuel and oxidant. The combustion system further includes a first and a second perforated flame holder. The first perforated flame holder is disposed to receive a first portion of the fuel and oxidant and to support a first combustion reaction of the fuel and oxidant within the perforated flame holder. The second perforated flame holder is disposed to receive a second portion of the fuel and oxidant and to support a second combustion reaction of the fuel and oxidant, the first and second perforated flame holders are separated by a gap. In an embodiment, the received fuel/air mixture subtends the gap. A portion of the fuel air mixture that passes to or through the gap is combusted with no significant increase in oxides of nitrogen NOx or carbon monoxide CO output.

According to an embodiment, a method includes supporting a first and a second perforated flame holder separated from each other in a furnace volume and separated by a gap. The method includes outputting fuel and oxidant from a fuel and oxidant source onto the first and second perforated flame holders. The method further includes sustaining a first combustion reaction of the fuel and oxidant within the first perforated flame holder and sustaining a second combustion reaction of the fuel and oxidant within the second perforated flame holder.

According to an embodiment, a combustion system includes a flame holder assembly positioned in a furnace volume. The flame holder assembly includes a plurality of perforated flame holders positioned to receive a flow of fuel and oxidant from a fuel and oxidant source and to hold a combustion reaction of the fuel and the oxidant within, between, upstream, and downstream of the perforated flame holders. The flame holder assembly includes a ceramic support structure operatively coupled to and configured to support the perforated flame holders within the furnace volume.

According to an embodiment, a method includes supporting an array of perforated flame holders above one or more fuel nozzles. The method includes outputting an oxidant, and a fuel stream including a fuel onto the perforated flame holders from the one or more fuel nozzles. The method also includes supporting a combustion reaction of the fuel and the oxidant between, upstream, downstream, and within the perforated flame holders.

According to an embodiment, a modular burner includes a metal flange that is configurable for attachment to a furnace wall. The metal flange includes an inner surface and an outer surface and defines a flange aperture that passes through the flange between the inner surface and the outer surface. A plurality of support legs are each operatively coupled to the metal flange and extend inwardly from the metal flange. Each support leg is formed at least partially from a ceramic material. A perforated flame holder is operatively coupled to each of the plurality of support legs such that the support legs collectively support the perforated flame holder at a distance from the metal flange. The perforated flame holder can include an input surface and an output surface. The perforated flame holder can be formed from a ceramic material. A combustion air register is operatively coupled to the metal flange and disposed adjacent to the outer surface of the metal flange. The combustion air register is configured to control a flow of combustion air through the flange aperture to the perforated flame holder. A fuel delivery system includes a plurality of fuel nozzles and is configured to deliver gaseous fuel toward the input surface of the perforated flame holder. The perforated flame holder is configured to hold a combustion reaction supported by a mixture of the gaseous fuel and the combustion air. In an embodiment, the plurality of legs and the perforated flame holder are configured for insertion through an aperture in the furnace wall. In an embodiment, the aperture can have a diameter of 19 inches or greater.

BRIEF DESCRIPTION OF THE DRAWINGS

FIG. 4 is a flow diagram for a process for operating a combustion system including a perforated flame holder, according to an embodiment.

FIG. 6 is a diagram of a combustion system including three perforated flame holders separated by a gap, according to an embodiment.

FIG. 9A is an illustration of a combustion system, according to an embodiment.

FIG. 9C is an illustration of the combustion system of FIG. 9A, according to an embodiment.

FIG. 9D is an enlarged view of a portion of the combustion system of FIG. 9A, according to an embodiment.

FIG. 10C is an enlarged view of an upper portion of the flame holder assembly of FIG. 10A, according to an embodiment.

DETAILED DESCRIPTION

Figure 1:
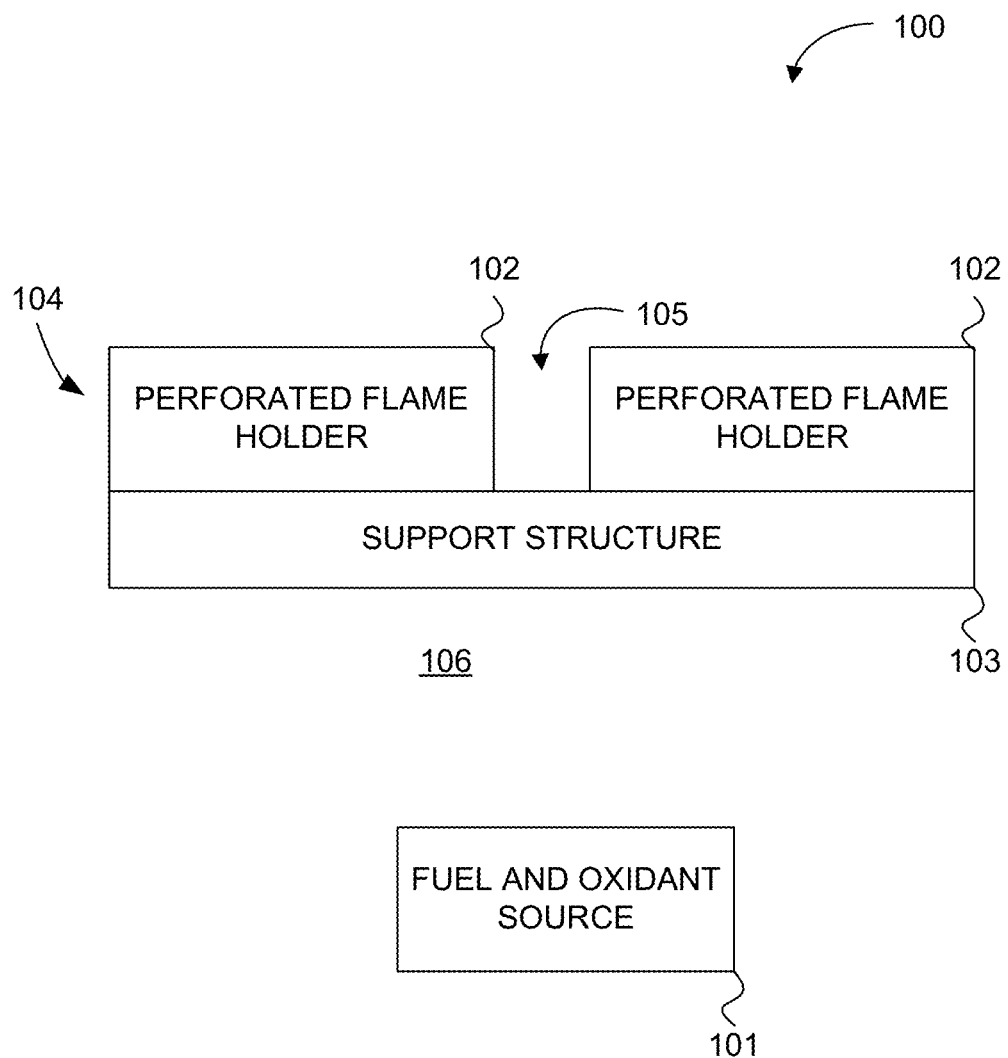
FIG. 1 is a block diagram of a combustion system, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a block diagram of a combustion system 100, according to an embodiment. The combustion system 100 includes a fuel and oxidant source 101, perforated flame holders 102, and a support structure 103. The perforated flame holders 102 are separated by a gap 105. The perforated flame holders 102 and the support structure 103 are positioned in a furnace volume 106.

The fuel and oxidant source 101 is configured to output fuel and oxidant onto the perforated flame holders 102. According to an embodiment, the perforated flame holders 102 sustain a combustion reaction of the fuel and oxidant primarily within the perforated flame holders 102. Alternatively, or additionally, the perforated flame holders 102 can sustain a combustion reaction of the fuel and the oxidant within, between, upstream, and downstream of the perforated flame holders 102.

According to an embodiment, the perforated flame holders 102 each include a first face, a second face, and a plurality of perforations extending between the first face and the second face.

According to an embodiment, the perforated flame holders 102 each include a reticulated ceramic tile.

The support structure 103 holds the perforated flame holders 102 at a selected position relative to the fuel and oxidant source 101 and relative to each other. In particular, the support structure 103 supports the perforated flame holders 102 with a gap 105 separating the perforated flame holders 102 from each other.

According to an embodiment, the gap 105 can help to keep the perforated flame holders 102 in a selected temperature range. In some cases, it is possible for the perforated flame holders 102 to become too hot. This can result in an increase in the output of undesirable emissions. According to an embodiment, the gap 105 helps to cool the perforated flame holders 102.

It has been found that if the gap 105 is sufficiently small, then the fuel and oxidant do not pass through the gap 105. According to an embodiment, the gap 105 is the width of two perforations of the perforated flame holder 102. This can correspond to a distance approximately between about 0.5 and 2 inches. If there is a gap of 2 inches or less, the temperature of the perforated flame holders 102 can be reduced due to additional cooling on the now exposed edges of the perforated flame holders 102. Furthermore, there is little or no fuel slip in the gap 105 if the gap 105 is less than 2 inches. This is partly because with a small gap 105 there is sufficient heat to cause combustion of the fuel and oxidant before the fuel and oxidant pass all the way through the gap 105. Additionally, the presence of the gap 105 does not cause a significant increase in CO or UCH emissions. In an embodiment, the received fuel/oxidant mixture subtends the gap 105. A portion of the fuel air mixture that passes to or through the gap 105 is combusted with no significant increase in NOx or CO output.

According to an embodiment, there are many advantages to having a reduced temperature in the perforated flame holders 102. These advantages can include a longer life of the perforated flame holders 102, increased firing capacity and heat density of the perforated flame holders 102, lower NOx emissions, reduced or even eliminated upstream flame propagation, and other possible benefits.

According to an embodiment, each of the perforated flame holders 102 can include multiple individual perforated flame holder tiles. In particular, each perforated flame holder 102 can include a respective group of individual perforated flame holder tiles positioned next to each other. The gap 105 can separate the groups of perforated flame holder tiles from each other. Each perforated flame holder tile can be a porous ceramic tile. Each perforated flame holder 102 can include a single porous ceramic tile or a group of porous ceramic tiles. The support structure 103 can include an array of ceramic support members on which the perforated flame holders 102 rest. The support members can include silicon carbide or another refractory material that can withstand high temperatures within the combustion environment. The support structure 103 can include large gaps through which the fuel and oxidant can pass into the perforated flame holders 102 or into the gap 105. The support members can be fixed to a furnace wall or can be part of a support structure 103 coupled to or resting on a floor of the furnace. According to an embodiment, the support members can include ceramic rods, bars, slats, or plates.

According to an embodiment, the support structure 103 can include one or more ceramic tubes. The perforated flame holders 102 can be positioned on top of the one or more ceramic tubes such that the ceramic tubes support the perforated flame holders 102. According to an embodiment, the one or more ceramic tubes can include fused quartz tubes. According to an embodiment, the one or more ceramic tubes can include silicon carbide tubes.

According to an embodiment, the ceramic tubes can be cooling tubes that assist in cooling the perforated flame holders 102. A cooling fluid can be passed through the cooling tubes. The cooling fluid cools the perforated flame holders 102 by heat transfer from the perforated flame holders 102 to the cooling fluid. Alternatively, the ceramic tubes can carry a working fluid configured to be heated by the perforated flame holders 102. Those of skill in the art will recognize, in light of the present disclosure, that many other configurations of a support structure 103 can be implemented.

According to an embodiment, the support structure 103 and the perforated flame holders 102 are entirely ceramic materials that are durable in very high temperature settings. The flame holder assembly 104 is suitable to be placed in very high temperature environments because weaker cements or metal components are not used to fix the individual components of the ceramic support structure 103 and the perforated flame holders 102 together.

According to an embodiment, the gaps 105 between the perforated flame holders 102 can affect a global pressure drop of the combustion system 100. The spacing between the perforated flame holders 102 can be modified based on operating conditions such as fuel composition, firing capacity, turndown requirements, etc. For example, natural gas fuels may require smaller gaps 105 between the perforated flame holders 102 than do hydrogen blends. Additionally, it may be advantageous to have smaller gaps 105 between the perforated flame holders 102 in hotter furnaces. The gaps 105 between adjacent perforated flame holders 102 can be selected based on various conditions of the combustion system 100.

According to an embodiment, the fuel and oxidant source 101 can include a fuel source and an oxidant source that are separate from each other but that collectively provide fuel and oxidant to the furnace volume 106. According to an embodiment, the fuel source can include one or more fuel nozzles. For example, the combustion system 100 can include a fuel nozzle for each perforated flame holder 102 or even for each perforated flame holder tile in a group of perforated flame holder tiles. Each fuel nozzle can include multiple outlet ports through which fuel and oxidant can be output to the perforated flame holders 102.

According to an embodiment, the fuel source can include a fuel source other than a fuel nozzle. The fuel source is configured to output fuel onto the perforated flame holders 102.

According to an embodiment, the oxidant source can include a blower or side mounted air register, a barrel register, a forced draft air injector, or other oxidant source suitable for providing an oxidant to the furnace volume 106.

According to an embodiment, the perforated flame holders 102 and the support structure 103 may be collectively termed a perforated flame holder assembly 104.

According to an embodiment, the combustion system 100 can include more than two perforated flame holders 102.

According to an embodiment, the perforated flame holders 102 may be supported in various arrangements. For example, the combustion system 100 may include one or more first perforated flame holders 102 oriented facing the fuel and oxidant source 101. The combustion system 100 may also include one or more second perforated flame holders 102 positioned with an orientation transverse or substantially perpendicular to the orientation of the first perforated flame holders 102.

Figure 2:
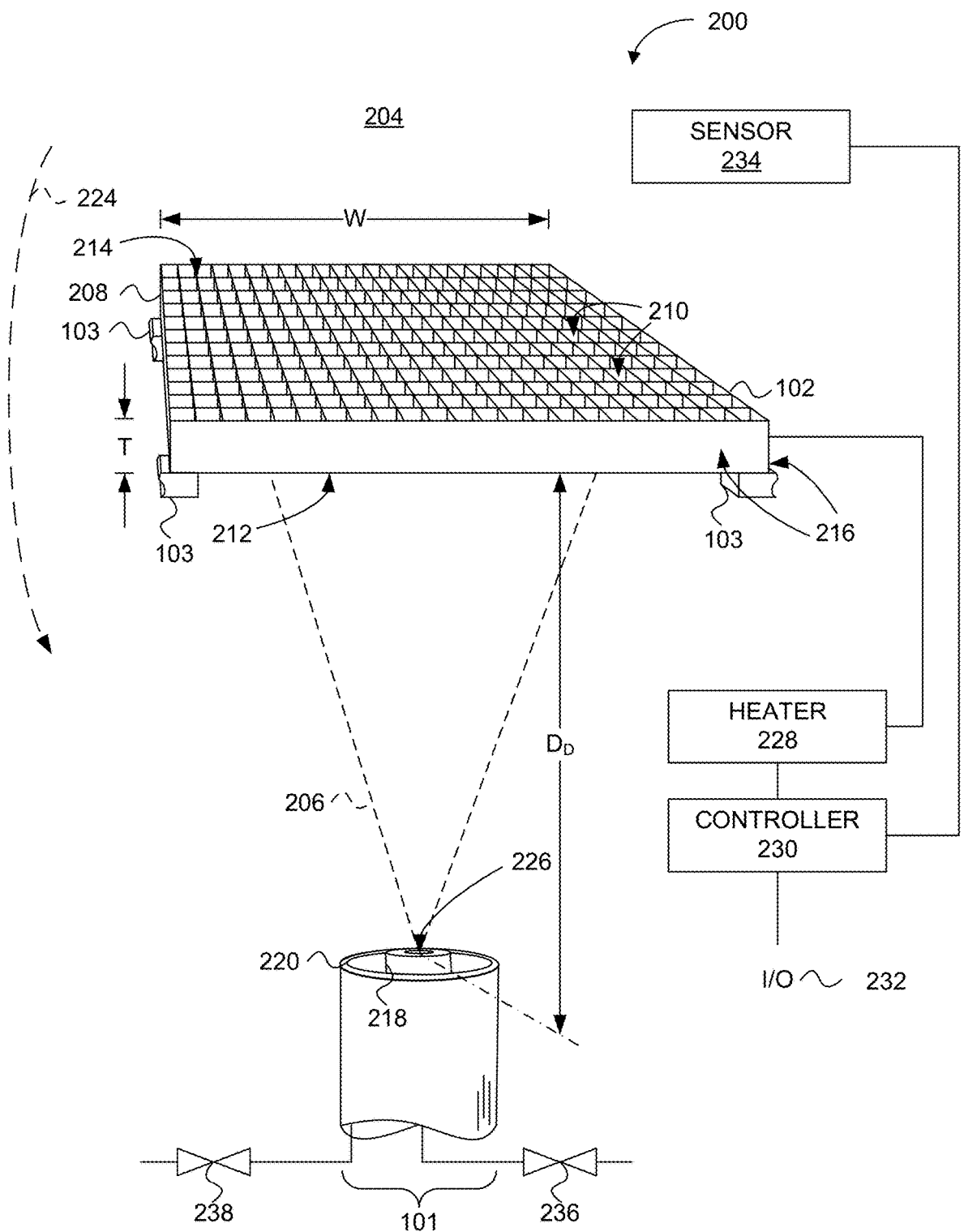
FIG. 2 is a diagram of a combustion system including a perforated flame holder, according to an embodiment.

FIG. 2 is a simplified diagram of a burner system 200 including a perforated flame holder 102 configured to hold a combustion reaction, according to an embodiment. As used herein, the terms perforated flame holder, perforated reaction holder, porous flame holder, porous reaction holder, duplex, and duplex tile shall be considered synonymous unless further definition is provided.

Experiments performed by the inventors have shown that perforated flame holders 102 described herein can support very clean combustion. Specifically, in experimental use of burner systems 200 ranging from pilot scale to full scale, output of oxides of nitrogen (NOx) was measured to range from low single digit parts per million (ppm) down to undetectable (less than 1 ppm) concentration of NOx at the stack. These remarkable results were measured at 3% (dry) oxygen ($O_2$) concentration with undetectable carbon monoxide (CO) at stack temperatures typical of industrial furnace applications (1400-1600° F.). Moreover, these results did not require any extraordinary measures such as selective catalytic reduction (SCR), selective non-catalytic reduction (SNCR), water/steam injection, external flue gas recirculation (FGR), or other heroic extremes that may be required for conventional burners to even approach such clean combustion.

According to embodiments, the burner system 200 includes a fuel and oxidant source 101 disposed to output fuel and oxidant into a furnace volume 204 to form a fuel and oxidant mixture 206. As used herein, the terms fuel and oxidant mixture and fuel stream may be used interchangeably and considered synonymous depending on the context, unless further definition is provided. As used herein, the terms furnace volume, combustion chamber, furnace volume, and the like shall be considered synonymous unless further definition is provided. The perforated flame holder 102 is disposed in the furnace volume 204 and positioned to receive the fuel and oxidant mixture 206.

Figure 3:
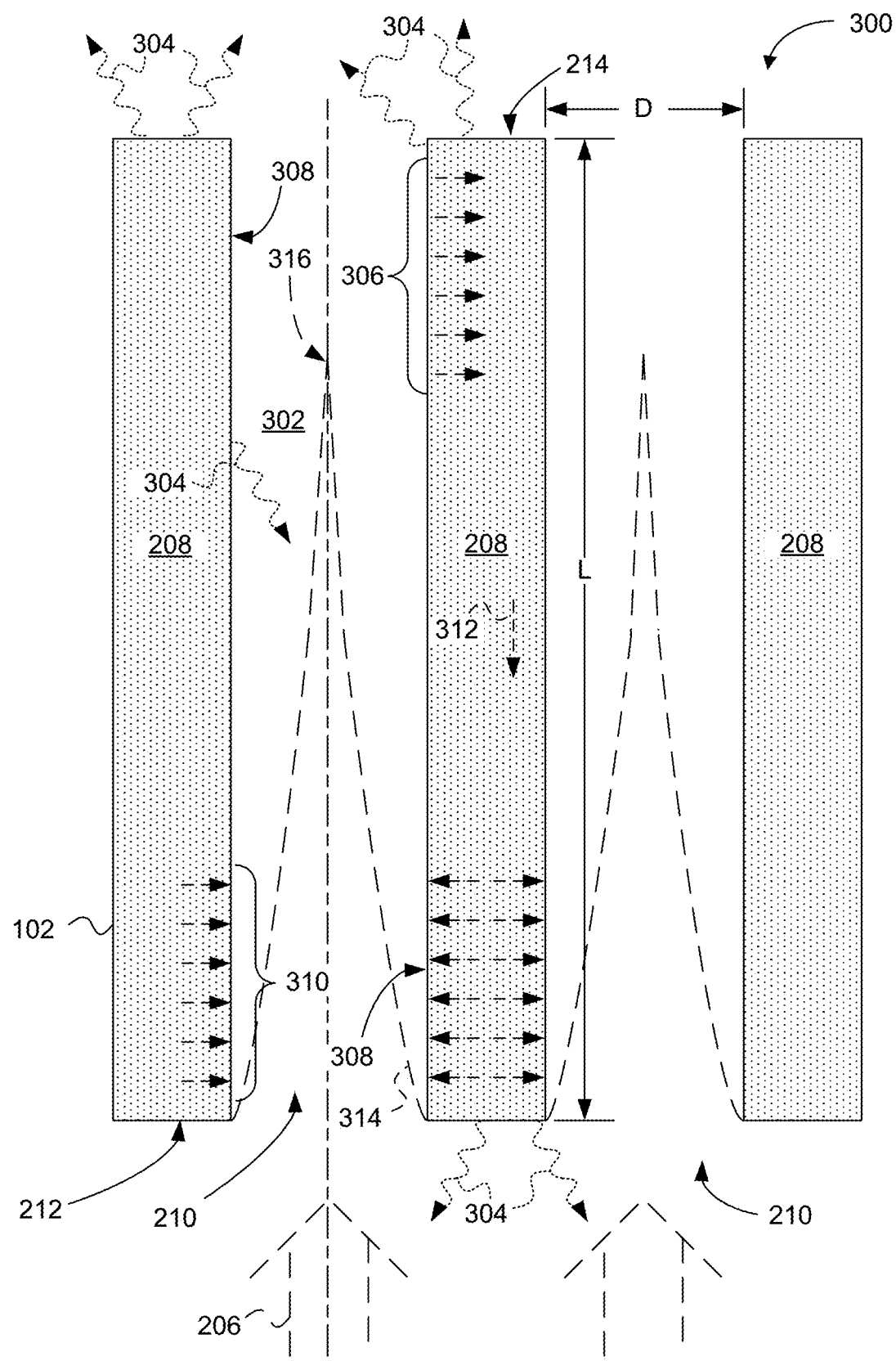
FIG. 3 is a cross-sectional diagram of a perforated flame holder, according to an embodiment.

FIG. 3 is a side sectional diagram 300 of a portion of the perforated flame holder 102 of FIGS. 1 and 2, according to an embodiment. Referring to FIGS. 2 and 3, the perforated flame holder 102 includes a perforated flame holder body 208 defining a plurality of perforations 210 aligned to receive the fuel and oxidant mixture 206 from the fuel and oxidant source 101. As used herein, the terms perforation, pore, aperture, elongated aperture, and the like, in the context of the perforated flame holder 102, shall be considered synonymous unless further definition is provided. The perforations 210 are configured to collectively hold a combustion reaction 302 supported by the fuel and oxidant mixture 206.

The fuel can include hydrogen, a hydrocarbon gas, a vaporized hydrocarbon liquid, an atomized hydrocarbon liquid, or a powdered or pulverized solid. The fuel can be a single species or can include a mixture of gas(es), vapor(s), atomized liquid(s), and/or pulverized solid(s). For example, in a process heater application the fuel can include fuel gas or byproducts from the process that include carbon monoxide (CO), hydrogen ($H_2$), and methane ($CH_4$). In another application the fuel can include natural gas (mostly $CH_4$) or propane ($C_3H_8$). In another application, the fuel can include #2 fuel oil or #6 fuel oil. Dual fuel applications and flexible fuel applications are similarly contemplated by the inventors. The oxidant can include oxygen carried by air, flue gas, and/or can include another oxidant, either pure or carried by a carrier gas. The terms oxidant and oxidizer shall be considered synonymous herein.

According to an embodiment, the perforated flame holder body 208 can be bounded by an input face 212 disposed to receive the fuel and oxidant mixture 206, an output face 214 facing away from the fuel and oxidant source 101, and a peripheral surface 216 defining a lateral extent of the perforated flame holder 102. The plurality of perforations 210 which are defined by the perforated flame holder body 208 extend from the input face 212 to the output face 214. The plurality of perforations 210 can receive the fuel and oxidant mixture 206 at the input face 212. The fuel and oxidant mixture 206 can then combust in or near the plurality of perforations 210 and combustion products can exit the plurality of perforations 210 at or near the output face 214.

According to an embodiment, the perforated flame holder 102 is configured to hold a majority of the combustion reaction 302 within the perforations 210. For example, on a steady-state basis, more than half the molecules of fuel output into the furnace volume 204 by the fuel and oxidant source 101 may be converted to combustion products between the input face 212 and the output face 214 of the perforated flame holder 102. According to an alternative interpretation, more than half of the heat or thermal energy output by the combustion reaction 302 may be output between the input face 212 and the output face 214 of the perforated flame holder 102. As used herein, the terms heat, heat energy, and thermal energy shall be considered synonymous unless further definition is provided. As used above, heat energy and thermal energy refer generally to the released chemical energy initially held by reactants during the combustion reaction 302. As used elsewhere herein, heat, heat energy and thermal energy correspond to a detectable temperature rise undergone by real bodies characterized by heat capacities. Under nominal operating conditions, the perforations 210 can be configured to collectively hold at least 80% of the combustion reaction 302 between the input face 212 and the output face 214 of the perforated flame holder 102. In some experiments, the inventors produced a combustion reaction 302 that was apparently wholly contained in the perforations 210 between the input face 212 and the output face 214 of the perforated flame holder 102. According to an alternative interpretation, the perforated flame holder 102 can support combustion between the input face 212 and output face 214 when combustion is "time-averaged." For example, during transients, such as before the perforated flame holder 102 is fully heated, or if too high a (cooling) load is placed on the system, the combustion may travel somewhat downstream from the output face 214 of the perforated flame holder 102. Alternatively, if the cooling load is relatively low and/or the furnace temperature reaches a high level, the combustion may travel somewhat upstream of the input face 212 of the perforated flame holder 102.

While a "flame" is described in a manner intended for ease of description, it should be understood that in some instances, no visible flame is present. Combustion occurs primarily within the perforations 210, but the "glow" of combustion heat is dominated by a visible glow of the perforated flame holder 102 itself. In other instances, the inventors have noted transient "huffing" or "flashback" wherein a visible flame momentarily ignites in a region lying between the input face 212 of the perforated flame holder 102 and the fuel nozzle 218, within the dilution region $D_D$. Such transient huffing or flashback is generally short in duration such that, on a time-averaged basis, a majority of combustion occurs within the perforations 210 of the perforated flame holder 102, between the input face 212 and the output face 214. In still other instances, the inventors have noted apparent combustion occurring downstream from the output face 214 of the perforated flame holder 102, but still a majority of combustion occurred within the perforated flame holder 102 as evidenced by continued visible glow from the perforated flame holder 102 that was observed.

The perforated flame holder 102 can be configured to receive heat from the combustion reaction 302 and output a portion of the received heat as thermal radiation 304 to heat-receiving structures (e.g., furnace walls and/or radiant section working fluid tubes) in or adjacent to the furnace volume 204. As used herein, terms such as radiation, thermal radiation, radiant heat, heat radiation, etc. are to be construed as being substantially synonymous, unless further definition is provided. Specifically, such terms refer to blackbody-type radiation of electromagnetic energy, primarily at infrared wavelengths, but also at visible wavelengths owing to elevated temperature of the perforated flame holder body 208.

Referring especially to FIG. 3, the perforated flame holder 102 outputs another portion of the received heat to the fuel and oxidant mixture 206 received at the input face 212 of the perforated flame holder 102. The perforated flame holder body 208 may receive heat from the combustion reaction 302 at least in heat receiving regions 306 of perforation walls 308. Experimental evidence has suggested to the inventors that the position of the heat receiving regions 306, or at least the position corresponding to a maximum rate of receipt of heat, can vary along the length of the perforation walls 308. In some experiments, the location of maximum receipt of heat was apparently between $\frac{1}{3}$ and $\frac{1}{2}$ of the distance from the input face 212 to the output face 214 (i.e., somewhat nearer to the input face 212 than to the output face 214). The inventors contemplate that the heat receiving regions 306 may lie nearer to the output face 214 of the perforated flame holder 102 under other conditions. Most probably, there is no clearly defined edge of the heat receiving regions 306 (or for that matter, the heat output regions 310, described below). For ease of understanding, the heat receiving regions 306 and the heat output regions 310 will be described as particular regions 306, 310.

The perforated flame holder body 208 can be characterized by a heat capacity. The perforated flame holder body 208 may hold thermal energy from the combustion reaction 302 in an amount corresponding to the heat capacity multiplied by temperature rise, and transfer the thermal energy from the heat receiving regions 306 to heat output regions 310 of the perforation walls 308. Generally, the heat output regions 310 are nearer to the input face 212 than are the heat receiving regions 306. According to one interpretation, the perforated flame holder body 208 can transfer heat from the heat receiving regions 306 to the heat output regions 310 via thermal radiation, depicted graphically as 304. According to another interpretation, the perforated flame holder body 208 can transfer heat from the heat receiving regions 306 to the heat output regions 310 via heat conduction along heat conduction paths 312. The inventors contemplate that multiple heat transfer mechanisms including conduction, radiation, and possibly convection may be operative in transferring heat from the heat receiving regions 306 to the heat output regions 310. In this way, the perforated flame holder 102 may act as a heat source to maintain the combustion reaction 302, even under conditions where a combustion reaction 302 would not be stable when supported from a conventional flame holder.

The inventors believe that the perforated flame holder 102 causes the combustion reaction 302 to begin within thermal boundary layers 314 formed adjacent to walls 308 of the perforations 210. Insofar as combustion is generally understood to include a large number of individual reactions, and since a large portion of combustion energy is released within the perforated flame holder 102, it is apparent that at least a majority of the individual reactions occur within the perforated flame holder 102. As the relatively cool fuel and oxidant mixture 206 approaches the input face 212, the flow is split into portions that respectively travel through individual perforations 210. The hot perforated flame holder body 208 transfers heat to the fluid, notably within thermal boundary layers 314 that progressively thicken as more and more heat is transferred to the incoming fuel and oxidant mixture 206. After reaching a combustion temperature (e.g., the auto-ignition temperature of the fuel), the reactants continue to flow while a chemical ignition delay time elapses, over which time the combustion reaction 302 occurs. Accordingly, the combustion reaction 302 is shown as occurring within the thermal boundary layers 314. As flow progresses, the thermal boundary layers 314 merge at a merger point 316. Ideally, the merger point 316 lies between the input face 212 and output face 214 that define the ends of the perforations 210. At some position along the length of a perforation 210, the combustion reaction 302 outputs more heat to the perforated flame holder body 208 than it receives from the perforated flame holder body 208. The heat is received at the heat receiving region 306, is held by the perforated flame holder body 208, and is transported to the heat output region 310 nearer to the input face 212, where the heat is transferred into the cool reactants (and any included diluent) to bring the reactants to the ignition temperature.

In an embodiment, each of the perforations 210 is characterized by a length L defined as a reaction fluid propagation path length between the input face 212 and the output face 214 of the perforated flame holder 102. As used herein, the term reaction fluid refers to matter that travels through a perforation 210. Near the input face 212, the reaction fluid includes the fuel and oxidant mixture 206 (optionally including nitrogen, flue gas, and/or other "non-reactive" species). Within the combustion reaction region, the reaction fluid may include plasma associated with the combustion reaction 302, molecules of reactants and their constituent parts, any non-reactive species, reaction intermediates (including transition states), and reaction products. Near the output face 214, the reaction fluid may include reaction products and byproducts, non-reactive gas, and excess oxidant.

The plurality of perforations 210 can be each characterized by a transverse dimension D between opposing perforation walls 308. The inventors have found that stable combustion can be maintained in the perforated flame holder 102 if the length L of each perforation 210 is at least four times the transverse dimension D of the perforation 210. In other embodiments, the length L can be greater than six times the transverse dimension D. For example, experiments have been run where L is at least eight, at least twelve, at least sixteen, and at least twenty-four times the transverse dimension D. Preferably, the length L is sufficiently long for thermal boundary layers 314 to form adjacent to the perforation walls 308 in a reaction fluid flowing through the perforations 210 to converge at merger points 316 within the perforations 210 between the input face 212 and the output face 214 of the perforated flame holder 102. In experiments, the inventors have found L/D ratios between 12 and 48 to work well (i.e., produce low NOx, produce low CO, and maintain stable combustion).

The perforated flame holder body 208 can be configured to convey heat between adjacent perforations 210. The heat conveyed between adjacent perforations 210 can be selected to cause heat output from the combustion reaction portion 302 in a first perforation 210 to supply heat to stabilize a combustion reaction portion 302 in an adjacent perforation 210.

Referring especially to FIG. 2, the fuel and oxidant source 101 can further include a fuel nozzle 218, configured to output fuel, and an oxidant source 220 configured to output a fluid including the oxidant. For example, the fuel nozzle 218 can be configured to output pure fuel. The oxidant source 220 can be configured to output combustion air carrying oxygen, and optionally, flue gas.

The perforated flame holder 102 can be held by a perforated flame holder support structure 222 configured to hold the perforated flame holder 102 at a dilution distance $D_D$ away from the fuel nozzle 218. The fuel nozzle 218 can be configured to emit a fuel jet selected to entrain the oxidant to form the fuel and oxidant mixture 206 as the fuel jet and oxidant travel along a path to the perforated flame holder 102 through the dilution distance $D_D$ between the fuel nozzle 218 and the perforated flame holder 102. Additionally or alternatively (particularly when a blower is used to deliver oxidant contained in combustion air), the oxidant or combustion air source can be configured to entrain the fuel and the fuel and oxidant travel through the dilution distance $D_D$. In some embodiments, a flue gas recirculation path 224 can be provided. Additionally or alternatively, the fuel nozzle 218 can be configured to emit a fuel jet selected to entrain the oxidant and to entrain flue gas as the fuel jet travels through the dilution distance $D_D$ between the fuel nozzle 218 and the input face 212 of the perforated flame holder 102.

The fuel nozzle 218 can be configured to emit the fuel through one or more fuel orifices 226 having an inside diameter dimension that is referred to as "nozzle diameter." The perforated flame holder support structure 222 can support the perforated flame holder 102 to receive the fuel and oxidant mixture 206 at the distance $D_D$ away from the fuel nozzle 218 greater than 20 times the nozzle diameter. In another embodiment, the perforated flame holder 102 is disposed to receive the fuel and oxidant mixture 206 at the distance $D_D$ away from the fuel nozzle 218 between 100 times and 1100 times the nozzle diameter. Preferably, the perforated flame holder support structure 222 is configured to hold the perforated flame holder 102 at a distance about 200 times or more of the nozzle diameter away from the fuel nozzle 218. When the fuel and oxidant mixture 206 travels about 200 times the nozzle diameter or more, the mixture is sufficiently homogenized to cause the combustion reaction 302 to produce minimal NOx.

The fuel and oxidant source 101 can alternatively include a premix fuel and oxidant source, according to an embodiment. A premix fuel and oxidant source can include a premix chamber (not shown), a fuel nozzle configured to output fuel into the premix chamber, and an oxidant (e.g., combustion air) channel configured to output the oxidant into the premix chamber. A flame arrestor can be disposed between the premix fuel and oxidant source and the perforated flame holder 102 and be configured to prevent flame flashback into the premix fuel and oxidant source.

The oxidant source 220, whether configured for entrainment in the furnace volume 204 or for premixing, can include a blower configured to force the oxidant through the fuel and oxidant source 101.

The perforated flame holder support structure 222 can be configured to support the perforated flame holder 102 from a floor or wall (not shown) of the furnace volume 204, for example. In another embodiment, the perforated flame holder support structure 222 supports the perforated flame holder 102 from the fuel and oxidant source 101. Alternatively, the perforated flame holder support structure 222 can suspend the perforated flame holder 102 from an overhead structure (such as a flue, in the case of an up-fired system). The perforated flame holder support structure 222 can support the perforated flame holder 102 in various orientations and directions.

The perforated flame holder 102 can include a single perforated flame holder body 208. In another embodiment, the perforated flame holder 102 can include a plurality of adjacent perforated flame holder sections that collectively provide a tiled perforated flame holder 102.

The perforated flame holder support structure 222 can be configured to support the plurality of perforated flame holder sections. The perforated flame holder support structure 222 can include a metal superalloy, a cementatious, and/or ceramic refractory material. In an embodiment, the plurality of adjacent perforated flame holder sections can be joined with a fiber reinforced refractory cement.

The perforated flame holder 102 can have a width dimension W between opposite sides of the peripheral surface 216 at least twice a thickness dimension T between the input face 212 and the output face 214. In another embodiment, the perforated flame holder 102 can have a width dimension W between opposite sides of the peripheral surface 216 at least three times, at least six times, or at least nine times the thickness dimension T between the input face 212 and the output face 214 of the perforated flame holder 102.

In an embodiment, the perforated flame holder 102 can have a width dimension W less than a width of the furnace volume 204. This can allow the flue gas recirculation path 224 from above to below the perforated flame holder 102 to lie between the peripheral surface 216 of the perforated flame holder 102 and the furnace volume wall (not shown).

Referring again to both FIGS. 2 and 3, the perforations 210 can be of various shapes. In an embodiment, the perforations 210 can include elongated squares, each having a transverse dimension D between opposing sides of the squares. In another embodiment, the perforations 210 can include elongated hexagons, each having a transverse dimension D between opposing sides of the hexagons. In yet another embodiment, the perforations 210 can include hollow cylinders, each having a transverse dimension D corresponding to a diameter of the cylinder. In another embodiment, the perforations 210 can include truncated cones or truncated pyramids (e.g., frustums), each having a transverse dimension D radially symmetric relative to a length axis that extends from the input face 212 to the output face 214. In some embodiments, the perforations 210 can each have a lateral dimension D equal to or greater than a quenching distance of the flame based on standard reference conditions. Alternatively, the perforations 210 may have lateral dimension D less then than a standard reference quenching distance.

In one range of embodiments, each of the plurality of perforations 210 has a lateral dimension D between 0.05 inch and 1.0 inch. Preferably, each of the plurality of perforations 210 has a lateral dimension D between 0.1 inch and 0.5 inch. For example the plurality of perforations 210 can each have a lateral dimension D of about 0.2 to 0.4 inch.

The void fraction of a perforated flame holder 102 is defined as the total volume of all perforations 210 in a section of the perforated flame holder 102 divided by a total volume of the perforated flame holder 102 including perforated flame holder body 208 and perforations 210. The perforated flame holder 102 should have a void fraction between 0.10 and 0.90. In an embodiment, the perforated flame holder 102 can have a void fraction between 0.30 and 0.80. In another embodiment, the perforated flame holder 102 can have a void fraction of about 0.70. Using a void fraction of about 0.70 was found to be especially effective for producing very low NOx.

The perforated flame holder 102 can be formed from a fiber reinforced cast refractory material and/or a refractory material such as an aluminum silicate material. For example, the perforated flame holder 102 can be formed to include mullite or cordierite. Additionally or alternatively, the perforated flame holder body 208 can include a metal superalloy such as Inconel or Hastelloy. The perforated flame holder body 208 can define a honeycomb. Honeycomb is an industrial term of art that need not strictly refer to a hexagonal cross section and most usually includes cells of square cross section. Honeycombs of other cross sectional areas are also known.

The inventors have found that the perforated flame holder 102 can be formed from VERSAGRID® ceramic honeycomb, available from Applied Ceramics, Inc. of Doraville, South Carolina.

The perforations 210 can be parallel to one another and normal to the input and output faces 212, 214. In another embodiment, the perforations 210 can be parallel to one another and formed at an angle relative to the input and output faces 212, 214. In another embodiment, the perforations 210 can be non-parallel to one another. In another embodiment, the perforations 210 can be non-parallel to one another and non-intersecting. In another embodiment, the perforations 210 can be intersecting. The perforated flame holder body 208 can be one piece or can be formed from a plurality of sections.

In another embodiment, which is not necessarily preferred, the perforated flame holder 102 may be formed from reticulated ceramic material. The term "reticulated" refers to a netlike structure. Reticulated ceramic material is often made by dissolving a slurry into a sponge of specified porosity, allowing the slurry to harden, and burning away the sponge and curing the ceramic.

In another embodiment, which is not necessarily preferred, the perforated flame holder 102 may be formed from a ceramic material that has been punched, bored or cast to create channels.

In another embodiment, the perforated flame holder 102 can include a plurality of tubes or pipes bundled together. The plurality of perforations 210 can include hollow cylinders and can optionally also include interstitial spaces between the bundled tubes. In an embodiment, the plurality of tubes can include ceramic tubes. Refractory cement can be included between the tubes and configured to adhere the tubes together. In another embodiment, the plurality of tubes can include metal (e.g., superalloy) tubes. The plurality of tubes can be held together by a metal tension member circumferential to the plurality of tubes and arranged to hold the plurality of tubes together. The metal tension member can include stainless steel, a superalloy metal wire, and/or a superalloy metal band.

The perforated flame holder body 208 can alternatively include stacked perforated sheets of material, each sheet having openings that connect with openings of subjacent and superjacent sheets. The perforated sheets can include perforated metal sheets, ceramic sheets and/or expanded sheets. In another embodiment, the perforated flame holder body 208 can include discontinuous packing bodies such that the perforations 210 are formed in the interstitial spaces between the discontinuous packing bodies. In one example, the discontinuous packing bodies include structured packing shapes. In another example, the discontinuous packing bodies include random packing shapes. For example, the discontinuous packing bodies can include ceramic Raschig ring, ceramic Berl saddles, ceramic Intalox saddles, and/or metal rings or other shapes (e.g., Super Raschig Rings) that may be held together by a metal cage.

The inventors contemplate various explanations for why burner systems including the perforated flame holder 102 provide such clean combustion.

According to an embodiment, the perforated flame holder 102 may act as a heat source to maintain a combustion reaction even under conditions where a combustion reaction would not be stable when supported by a conventional flame holder. This capability can be leveraged to support combustion using a leaner fuel-to-oxidant mixture than is typically feasible. Thus, according to an embodiment, at the point where the fuel stream 206 contacts the input face 212 of the perforated flame holder 102, an average fuel-to-oxidant ratio of the fuel stream 206 is below a (conventional) lower combustion limit of the fuel component of the fuel stream 206—lower combustion limit defines the lowest concentration of fuel at which a fuel and oxidant mixture 206 will burn when exposed to a momentary ignition source under normal atmospheric pressure and an ambient temperature of 25° C. (77° F.).

The perforated flame holder 102 and systems including the perforated flame holder 102 described herein were found to provide substantially complete combustion of CO (single digit ppm down to undetectable, depending on experimental conditions), while supporting low NOx. According to one interpretation, such a performance can be achieved due to a sufficient mixing used to lower peak flame temperatures (among other strategies). Flame temperatures tend to peak under slightly rich conditions, which can be evident in any diffusion flame that is insufficiently mixed. By sufficiently mixing, a homogenous and slightly lean mixture can be achieved prior to combustion. This combination can result in reduced flame temperatures, and thus reduced NOx formation. According to an embodiment, "slightly lean" may refer to 3% $O_2$, i.e., an equivalence ratio of ~0.87. Use of even leaner mixtures is possible, but may result in elevated levels of $O_2$. Moreover, the inventors believe perforation walls 308 may act as a heat sink for the combustion fluid. This effect may alternatively or additionally reduce combustion temperatures and lower NOx.

According to another interpretation, production of NOx can be reduced if the combustion reaction 302 occurs over a very short duration of time. Rapid combustion causes the reactants (including oxygen and entrained nitrogen) to be exposed to NOx-formation temperature for a time too short for NOx formation kinetics to cause significant production of NOx. The time required for the reactants to pass through the perforated flame holder 102 is very short compared to a conventional flame. The low NOx production associated with perforated flame holder combustion may thus be related to the short duration of time required for the reactants (and entrained nitrogen) to pass through the perforated flame holder 102.

FIG. 4 is a flow chart showing a method 400 for operating a burner system including the perforated flame holder shown and described herein. To operate a burner system including a perforated flame holder, the perforated flame holder is first heated to a temperature sufficient to maintain combustion of the fuel and oxidant mixture.

According to a simplified description, the method 400 begins with step 402, wherein the perforated flame holder is preheated to a start-up temperature, $T_S$. After the perforated flame holder is raised to the start-up temperature, the method proceeds to step 404, wherein the fuel and oxidant are provided to the perforated flame holder and combustion is held by the perforated flame holder.

According to a more detailed description, step 402 begins with step 406, wherein start-up energy is provided at the perforated flame holder. Simultaneously or following providing start-up energy, a decision step 408 determines whether the temperature T of the perforated flame holder is at or above the start-up temperature, $T_S$. As long as the temperature of the perforated flame holder is below its start-up temperature, the method loops between steps 406 and 408 within the preheat step 402. In decision step 408, if the temperature T of at least a predetermined portion of the perforated flame holder is greater than or equal to the start-up temperature, the method 400 proceeds to overall step 404, wherein fuel and oxidant is supplied to and combustion is held by the perforated flame holder.

Step 404 may be broken down into several discrete steps, at least some of which may occur simultaneously.

Proceeding from decision step 408, a fuel and oxidant mixture is provided to the perforated flame holder, as shown in step 410. The fuel and oxidant may be provided by a fuel and oxidant source that includes a separate fuel nozzle and oxidant (e.g., combustion air) source, for example. In this approach, the fuel and oxidant are output in one or more directions selected to cause the fuel and oxidant mixture to be received by the input face of the perforated flame holder. The fuel may entrain the combustion air (or alternatively, the combustion air may dilute the fuel) to provide a fuel and oxidant mixture at the input face of the perforated flame holder at a fuel dilution selected for a stable combustion reaction that can be held within the perforations of the perforated flame holder.

Proceeding to step 412, the combustion reaction is held by the perforated flame holder.

In step 414, heat may be output from the perforated flame holder. The heat output from the perforated flame holder may be used to power an industrial process, heat a working fluid, generate electricity, or provide motive power, for example.

In optional step 416, the presence of combustion may be sensed. Various sensing approaches have been used and are contemplated by the inventors. Generally, combustion held by the perforated flame holder is very stable and no unusual sensing requirement is placed on the system. Combustion sensing may be performed using an infrared sensor, a video sensor, an ultraviolet sensor, a charged species sensor, thermocouple, thermopile, flame rod, and/or other combustion sensing apparatuses. In an additional or alternative variant of step 416, a pilot flame or other ignition source may be provided to cause ignition of the fuel and oxidant mixture in the event combustion is lost at the perforated flame holder.

Proceeding to decision step 418, if combustion is sensed not to be stable, the method 400 may exit to step 424, wherein an error procedure is executed. For example, the error procedure may include turning off fuel flow, re-executing the preheating step 402, outputting an alarm signal, igniting a stand-by combustion system, or other steps. If, in decision step 418, combustion in the perforated flame holder is determined to be stable, the method 400 proceeds to decision step 420, wherein it is determined if combustion parameters should be changed. If no combustion parameters are to be changed, the method loops (within step 404) back to step 410, and the combustion process continues. If a change in combustion parameters is indicated, the method 400 proceeds to step 422, wherein the combustion parameter change is executed. After changing the combustion parameter(s), the method loops (within step 404) back to step 410, and combustion continues.

Combustion parameters may be scheduled to be changed, for example, if a change in heat demand is encountered. For example, if less heat is required (e.g., due to decreased electricity demand, decreased motive power requirement, or lower industrial process throughput), the fuel and oxidant flow rate may be decreased in step 422. Conversely, if heat demand is increased, then fuel and oxidant flow may be increased. Additionally or alternatively, if the combustion system is in a start-up mode, then fuel and oxidant flow may be gradually increased to the perforated flame holder over one or more iterations of the loop within step 404.

Referring again to FIG. 2, the burner system 200 includes a heater 228 operatively coupled to the perforated flame holder 102. As described in conjunction with FIGS. 3 and 4, the perforated flame holder 102 operates by outputting heat to the incoming fuel and oxidant mixture 206. After combustion is established, this heat is provided by the combustion reaction 302; but before combustion is established, the heat is provided by the heater 228.

Various heating apparatuses have been used and are contemplated by the inventors. In some embodiments, the heater 228 can include a flame holder configured to support a flame disposed to heat the perforated flame holder 102. The fuel and oxidant source 101 can include a fuel nozzle 218 configured to emit a fuel stream 206 and an oxidant source 220 configured to output oxidant (e.g., combustion air) adjacent to the fuel stream 206. The fuel nozzle 218 and oxidant source 220 can be configured to output the fuel stream 206 to be progressively diluted by the oxidant (e.g., combustion air). The perforated flame holder 102 can be disposed to receive a diluted fuel and oxidant mixture 206 that supports a combustion reaction 302 that is stabilized by the perforated flame holder 102 when the perforated flame holder 102 is at an operating temperature. A start-up flame holder, in contrast, can be configured to support a start-up flame at a location corresponding to a relatively unmixed fuel and oxidant mixture that is stable without stabilization provided by the heated perforated flame holder 102.

The burner system 200 can further include a controller 230 operatively coupled to the heater 228 and to a data interface 232. For example, the controller 230 can be configured to control a start-up flame holder actuator configured to cause the start-up flame holder to hold the start-up flame when the perforated flame holder 102 needs to be pre-heated and to not hold the start-up flame when the perforated flame holder 102 is at an operating temperature (e.g., when $T \geq T_S$).

Various approaches for actuating a start-up flame are contemplated. According to an embodiment, the start-up flame holder includes a mechanically-actuated bluff body configured to be actuated to intercept the fuel and oxidant mixture 206 to cause heat-recycling and/or stabilizing vortices and thereby hold a start-up flame; or to be actuated to not intercept the fuel and oxidant mixture 206 to cause the fuel and oxidant mixture 206 to proceed to the perforated flame holder 102. In another embodiment, a fuel control valve, blower, and/or damper may be used to select a fuel and oxidant mixture flow rate that is sufficiently low for a start-up flame to be jet-stabilized; and upon reaching a perforated flame holder 102 operating temperature, the flow rate may be increased to "blow out" the start-up flame. In another embodiment, the heater 228 may include an electrical power supply operatively coupled to the controller 230 and configured to apply an electrical charge or voltage to the fuel and oxidant mixture 206. An electrically conductive start-up flame holder may be selectively coupled to a voltage ground or other voltage selected to attract the electrical charge in the fuel and oxidant mixture 206. The attraction of the electrical charge was found by the inventors to cause a start-up flame to be held by the electrically conductive start-up flame holder.

In another embodiment, the heater 228 may include an electrical resistance heater configured to output heat to the perforated flame holder 102 and/or to the fuel and oxidant mixture 206. The electrical resistance heater can be configured to heat up the perforated flame holder 102 to an operating temperature. The heater 228 can further include a power supply and a switch operable, under control of the controller 230, to selectively couple the power supply to the electrical resistance heater.

An electrical resistance heater 228 can be formed in various ways. For example, the electrical resistance heater 228 can be formed from KANTHAL® wire (available from Sandvik Materials Technology division of Sandvik AB of Hallstahammar, Sweden) threaded through at least a portion of the perforations 210 defined by the perforated flame holder body 208. Alternatively, the heater 228 can include an inductive heater, a high-energy beam heater (e.g., microwave or laser), a frictional heater, electro-resistive ceramic coatings, or other types of heating technologies.

Other forms of start-up apparatuses are contemplated. For example, the heater 228 can include an electrical discharge igniter or hot surface igniter configured to output a pulsed ignition to the oxidant and fuel. Additionally or alternatively, a start-up apparatus can include a pilot flame apparatus disposed to ignite the fuel and oxidant mixture 206 that would otherwise enter the perforated flame holder 102. The electrical discharge igniter, hot surface igniter, and/or pilot flame apparatus can be operatively coupled to the controller 230, which can cause the electrical discharge igniter or pilot flame apparatus to maintain combustion of the fuel and oxidant mixture 206 in or upstream from the perforated flame holder 102 before the perforated flame holder 102 is heated sufficiently to maintain combustion.

The burner system 200 can further include a sensor 234 operatively coupled to the control circuit 230. The sensor 234 can include a heat sensor configured to detect infrared radiation or a temperature of the perforated flame holder 102. The control circuit 230 can be configured to control the heating apparatus 228 responsive to input from the sensor 234. Optionally, a fuel control valve 236 can be operatively coupled to the controller 230 and configured to control a flow of fuel to the fuel and oxidant source 101. Additionally or alternatively, an oxidant blower or damper 238 can be operatively coupled to the controller 230 and configured to control flow of the oxidant (or combustion air).

The sensor 234 can further include a combustion sensor operatively coupled to the control circuit 230, the combustion sensor being configured to detect a temperature, video image, and/or spectral characteristic of a combustion reaction held by the perforated flame holder 102. The fuel control valve 236 can be configured to control a flow of fuel from a fuel source to the fuel and oxidant source 101. The controller 230 can be configured to control the fuel control valve 236 responsive to input from the combustion sensor 234. The controller 230 can be configured to control the fuel control valve 236 and/or oxidant blower or damper 238 to control a preheat flame type of heater 228 to heat the perforated flame holder 102 to an operating temperature. The controller 230 can similarly control the fuel control valve 236 and/or the oxidant blower or damper 238 to change the fuel and oxidant mixture 206 flow responsive to a heat demand change received as data via the data interface 232.

Figure 5A:
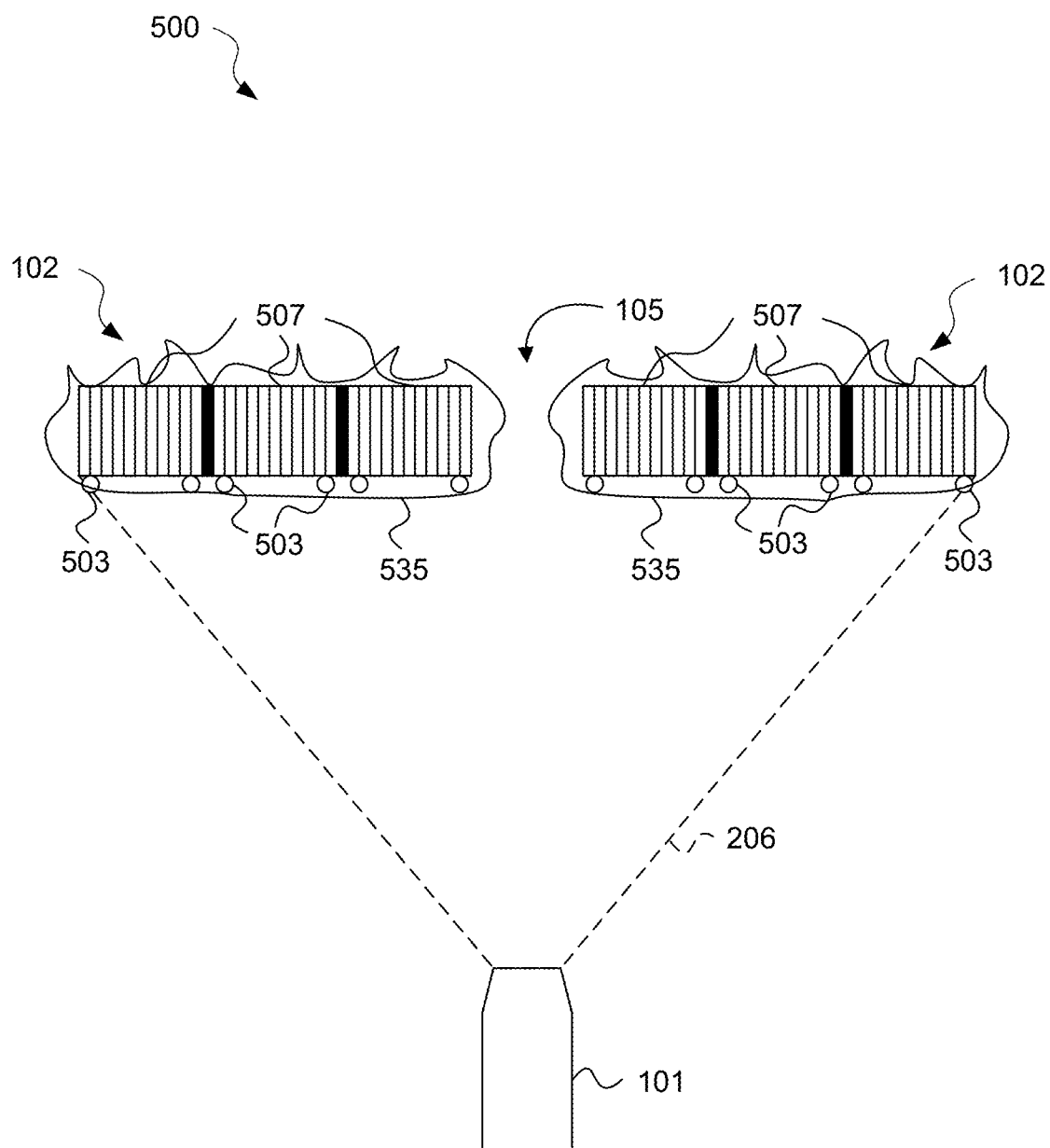
FIG. 5A is a diagram of a combustion system including perforated flame holders separated by a gap, according to an embodiment.

FIG. 5A is a diagram of a combustion system 500, according to an embodiment. The combustion system 500 includes a fuel and oxidant source 101, perforated flame holders 102, and support tubes 503.

The fuel and oxidant source 101 outputs fuel and oxidant 206 onto the perforated flame holders 102. The fuel and oxidant 206 enters into the perforations of the perforated flame holders 102. The perforated flame holders 102 support a combustion reaction 535 of the fuel and oxidant 206 within the perforations of the perforated flame holders 102.

Each of the perforated flame holders 102 includes multiple individual perforated flame holder tiles 507 joined together. Thus, each perforated flame holder 102 can be considered a group of perforated flame holder tiles 507. The perforated flame holder tiles 507 can be joined together by an adhesive such as mortar, or by merely being placed in contact with each other without any adhesive. Those of skill in the art will recognize, in light of the present disclosure, that there are many ways to join individual perforated flame holder tiles 507. All such other ways of joining individual perforated flame holder tiles 507 fall within the scope of the present disclosure.

According to an embodiment, each perforated flame holder tile 507 can be a porous ceramic tile. The porous ceramic tiles can include reticulated ceramic tiles. Alternatively, the porous ceramic tiles that include perforations extending substantially parallel between an input face and an output face of the porous ceramic tiles.

The perforated flame holders 102 are supported by support tubes 503. The support tubes 503 are, for example, silicon carbide or fused quartz tubes that can withstand very high temperature environments. Alternatively, the support tubes 503 can include other refractory materials able to withstand very high temperatures. The gaps between the support tubes 503 allow the fuel and oxidant 206 to enter into the perforations of the perforated flame holders 102.

According to an embodiment, the support tubes 503 can be hollow tubes that allow a cooling fluid to pass therethrough. The cooling fluid can serve to cool the perforated flame holders 102 to help maintain the temperature of the perforated flame holders 102 within a selected temperature range. The cooling fluid can be air, water, or any other suitable cooling fluid. Alternatively, the support tubes 503 can pass a working fluid therethrough. The working fluid can be heated by the perforated flame holders 102.

Figure 5B:
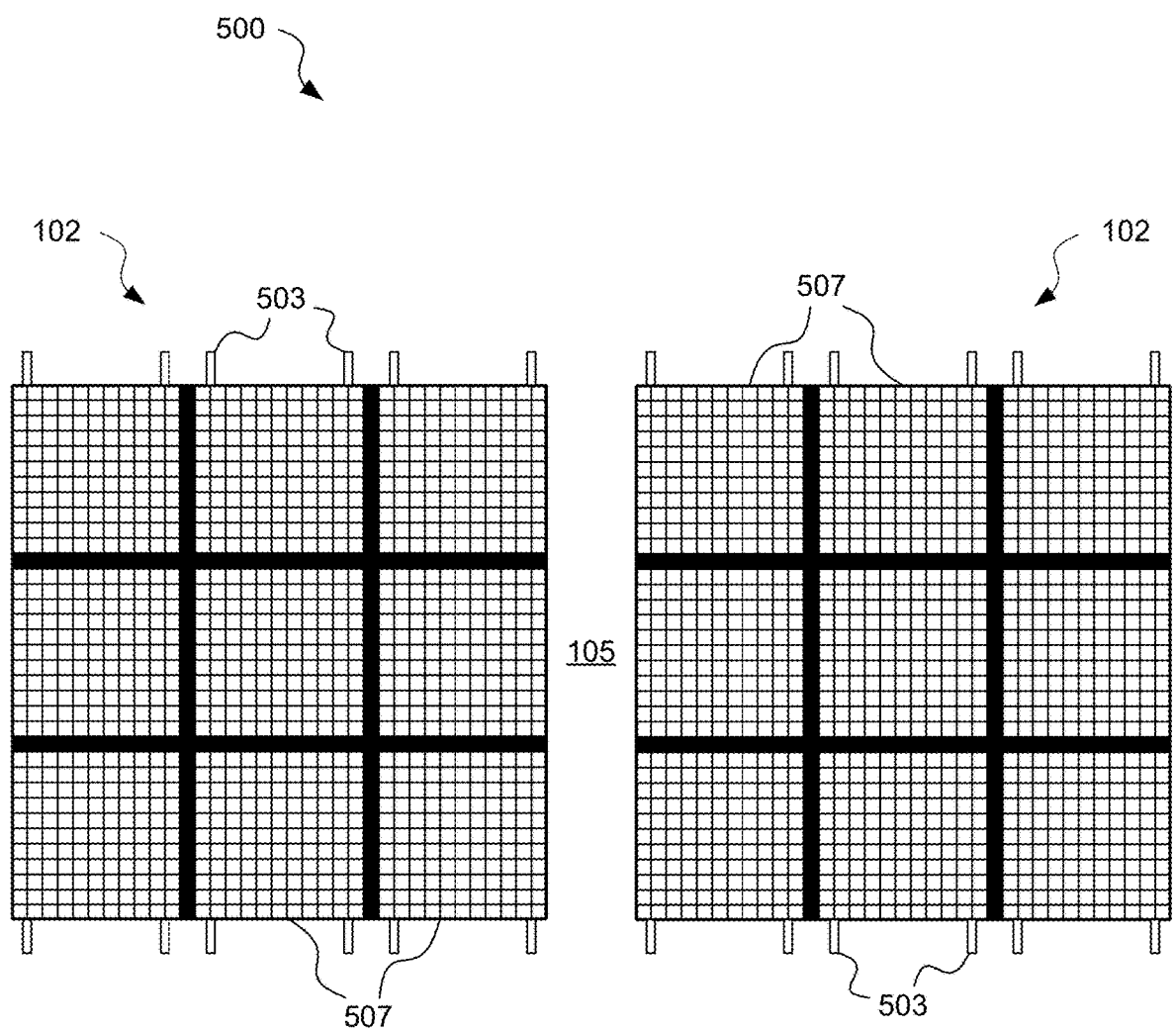
FIG. 5B is a top view of the perforated flame holders of FIG. 5A, according to an embodiment.

FIG. 5B is a top view of the perforated flame holders 102 of the combustion system 500 of FIG. 5A, according to an embodiment. Each of the perforated flame holders 102 include nine tiles 507. Each of the perforated flame holder tiles 507 rests on a set of support tubes 503. The perforated flame holders 102 are separated from each other by a gap 105.

According to an embodiment, each of the perforated flame holder tiles 507 is a distinct perforated flame holder 102. When the perforated flame holder tiles 507 are joined together to form the perforated flame holders 102, the perforated flame holders 102 can be described as respective groups of perforated flame holders 102 separated by the gap 105.

According to an embodiment, the fuel and oxidant source 101 can include a fuel source and a separate oxidant source. For example, the fuel and oxidant source 101 may include one or more fuel nozzles that output fuel toward the perforated flame holders 102. The fuel and oxidant source 101 may also include an oxidant source that introduces an oxidant into the furnace volume. The fuel from the one or more fuel nozzles mixes with the oxidant as the fuel travels towards the perforated flame holders 102. Thus, the fuel and oxidant 206 can include a fuel stream that entrains oxidant as it travels towards the perforated flame holders 102.

FIG. 6 is a diagram of a combustion system 600, according to an embodiment. The combustion system 600 includes three fuel nozzles 618 and three perforated flame holders 102. The combustion system 600 also includes an oxidant source 220.

The oxidant source 220 introduces an oxidant into the furnace volume. The fuel nozzles 618 each output a fuel stream 206 onto a respective one of the perforated flame holders 102. The fuel streams 206 mix with the oxidant as the fuel streams 206 travel toward the perforated flame holders 102. The fuel and oxidant 206 enter into the perforated flame holders 102. The perforated flame holders 102 support combustion reactions 535 of the fuel and oxidant 206 within the perforated flame holders 102.

Each of the perforated flame holders 102 includes multiple individual perforated flame holder tiles 507 joined together. Thus, each perforated flame holder 102 can be considered a group of perforated flame holders 102. The perforated flame holder tiles 507 can be joined together by an adhesive such as mortar, or by merely being placed in contact with each other without any adhesive.

Figure 7:
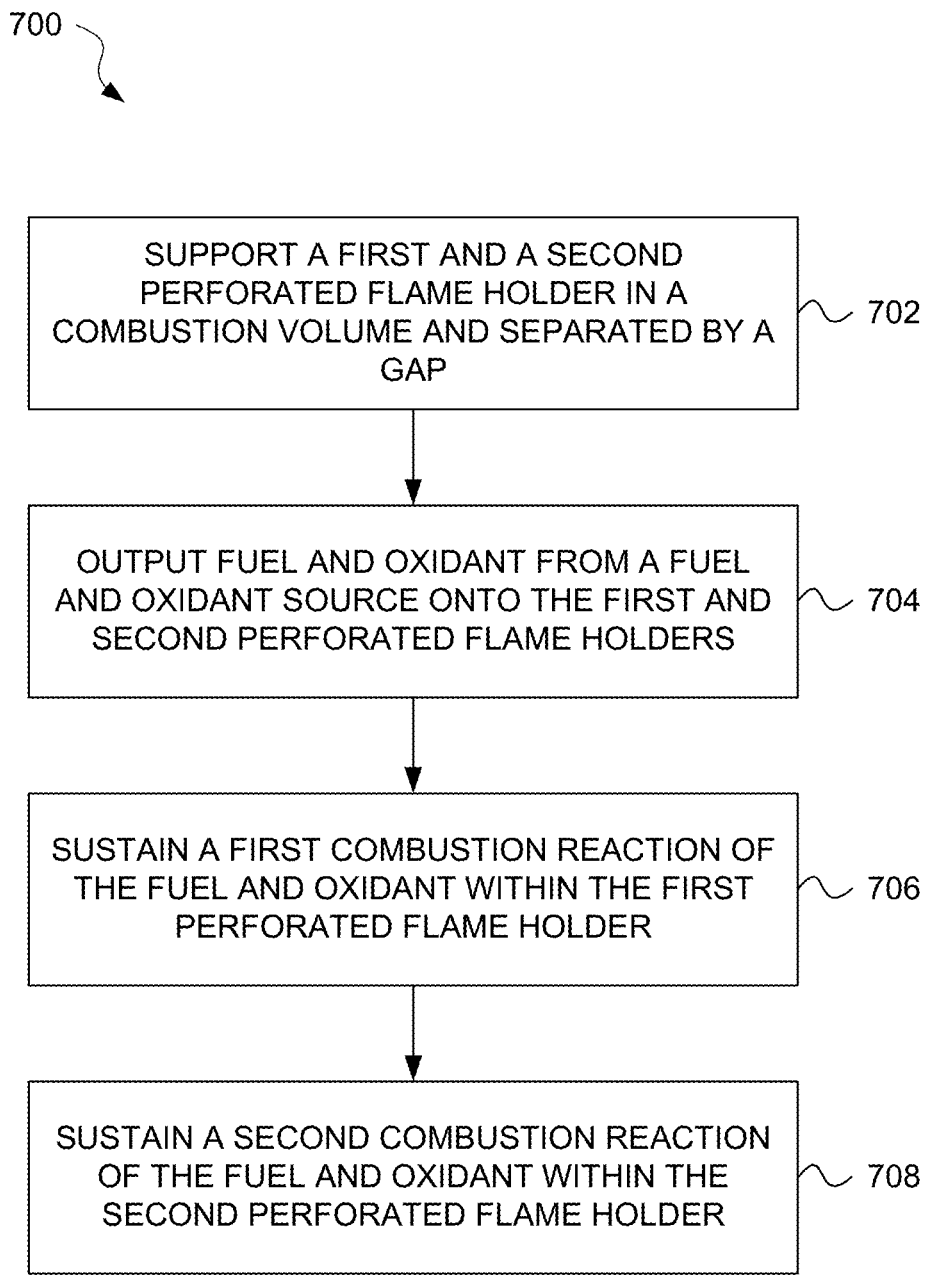
FIG. 7 is a flow diagram of a process for operating a combustion system, according to an embodiment.

FIG. 7 is a flow diagram of a process 700 for operating a combustion system, according to an embodiment. At 702, the process supports a first and a second perforated flame holder in a furnace volume and separated from each other by a gap. The first and second perforated flame holders are positioned to receive fuel and oxidant from a fuel and oxidant source. At 704, the process outputs fuel and oxidant from the fuel and oxidant source onto the first and second perforated flame holders. The fuel and oxidant enter into the perforations of the perforated flame holders. At 706, the process sustains the first combustion reaction of the fuel and oxidant within the first perforated flame holder. At 708, the process sustains a second combustion reaction of the fuel and oxidant within the second perforated flame holder.

Perforated flame holder technology solves problems associated with previous burner technologies, dropping oxides of nitrogen (NOx) emissions to very low levels while increasing fuel efficiency and process throughput, ushering in a new era of economically advantageous environmental compliance.

Unlike current burner technology, the perforated flame holder modular burner product line provides the only burner design that can eliminate flame impingement on fired heater equipment process tubes to greatly enhance tube life.

Figure 8A:
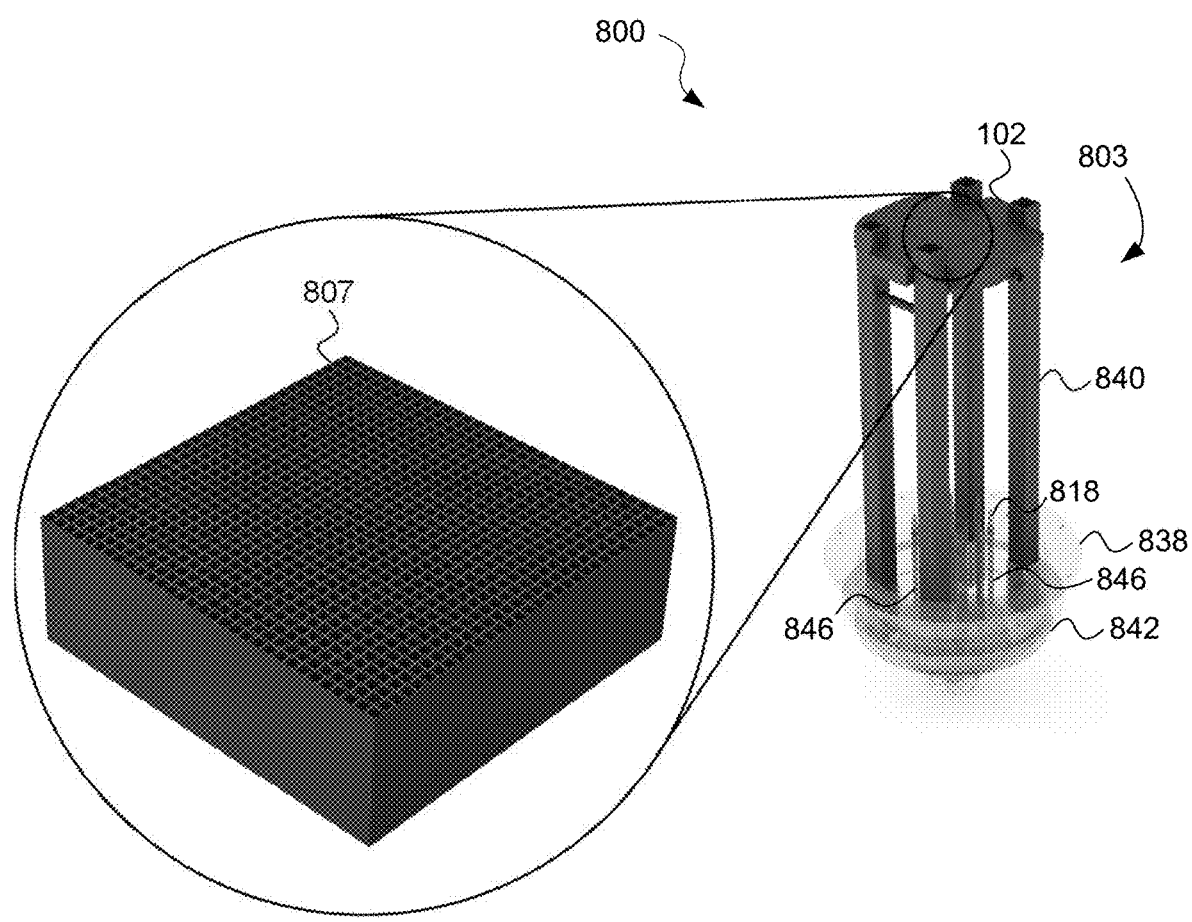
FIG. 8A is a diagram of a modular burner including a perforated flame holder supported by a support structure, according to an embodiment.

FIG. 8A is a diagram of a modular burner 800 including a perforated flame holder 102 supported by a support structure 803, according to an embodiment. The perforated flame holder 102 can be formed from a plurality of tiles 807.

Figure 8B:
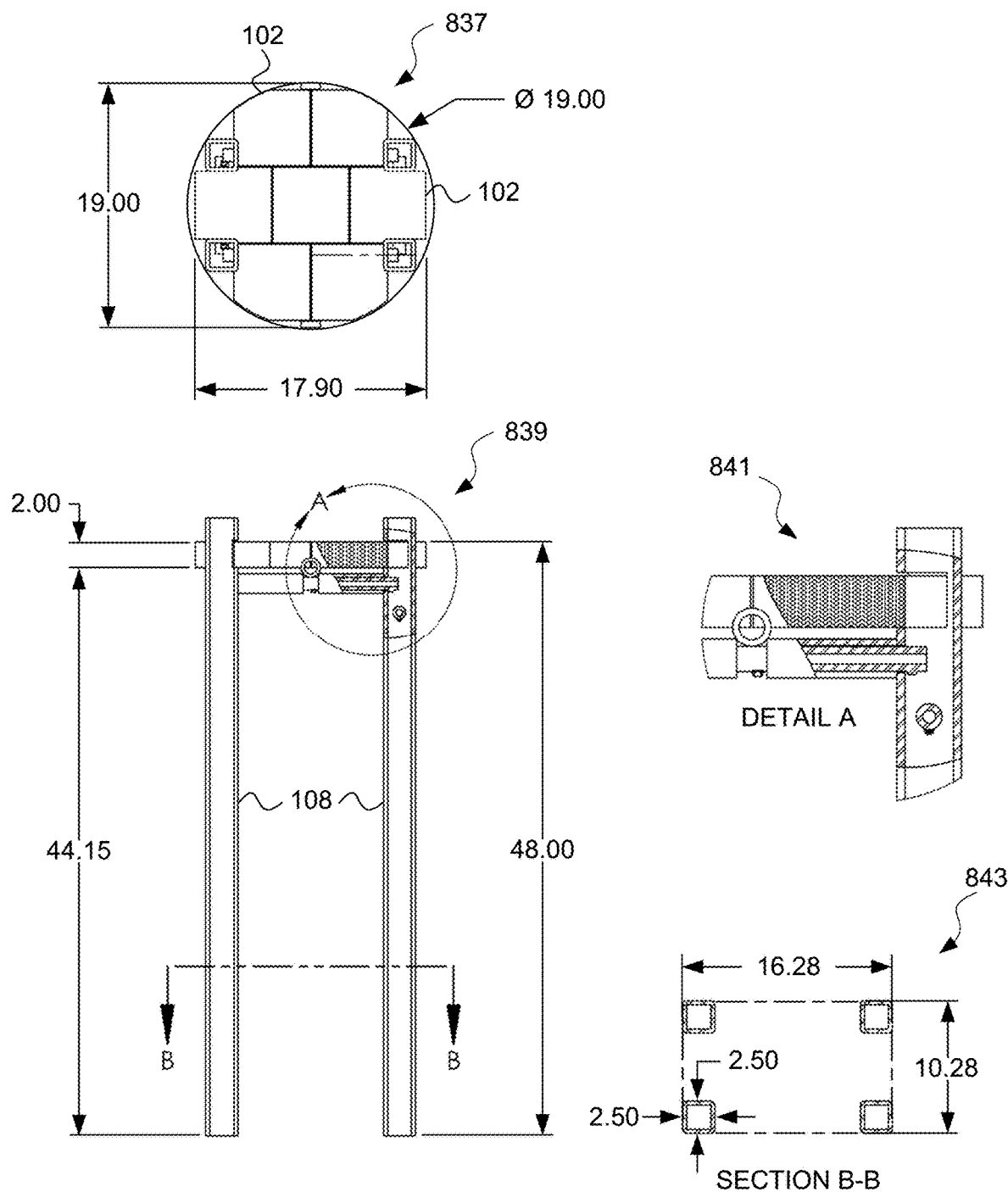
FIG. 8B is a diagram the modular burner of FIG. 8A including a plurality of views of the modular burner of FIG. 8A, according to embodiments.

FIG. 8B includes a plurality of views 837, 839, 841, and 843 of the modular burner 800 of FIG. 8A, according to embodiments. The views 837, 839, 841, and 843 include dimensions given in inches.

Referring to FIGS. 8A and 8B, the modular burner 800 includes a metal flange 838 that is configurable for attachment to a furnace wall. The metal flange 838 includes an inner surface and an outer surface. The metal flange 838 can define a flange aperture passing through the flange between the inner surface and the outer surface. The support structure 803 includes a plurality of support legs 840 that are each operatively coupled to the metal flange 838 and extend inwardly from the metal flange 838, each support leg 840 is formed at least partially from a ceramic material. A perforated flame holder 102 is supported by and operatively coupled to each of the plurality of support legs 840 such that the support legs 840 collectively support the perforated flame holder 102 at a distance from the metal flange 838. The perforated flame holder 102 includes an input surface and an output surface. The perforated flame holder 102 is formed from a ceramic material.

According to an embodiment, the perforated flame holder 102 is formed from silicon carbide tiles 807 about six inches by six inches laterally and about two inches thick. In another embodiment, the perforated flame holder 102 is formed from zirconia tiles 807 about four inches by four inches laterally and about one inch thick. Optionally, the tiles 807 of the perforated flame holder 102 may be separated by gaps 105 of between one-quarter inch and one inch in width. Optionally, the perforated flame holder 102 may be formed to be non-planar.

A combustion air register 842 is operatively coupled to the metal flange 838 and disposed adjacent to the outer surface of the metal flange 838. The combustion air register 842 is configured to control a flow of combustion air through the flange aperture to the perforated flame holder 102. A fuel delivery system including a plurality of fuel nozzles 818 is configured to deliver gaseous fuel toward the input surface of the perforated flame holder 102. The perforated flame holder 102 is configured to hold a combustion reaction 535 supported by a mixture of the gaseous fuel and the combustion air.

In an embodiment, the plurality of support legs 840 and the perforated flame holder 102 is configured for insertion through an aperture in the furnace wall having a diameter of 19 inches or greater.

The metal flange 838 can be configured for attachment to a particular furnace wall by drilling mounting holes in the metal flange 838 to match locations of mounting holes in the particular furnace peripheral to a furnace wall aperture.

Each of the support legs 840 can be formed as a ceramic tube. The support legs 840 can be formed from silicon carbide. In another embodiment, the support legs 840 are formed from zirconia. In an embodiment, each of the support legs 840 is 48 inches long.

A plurality of metal support weldments (not shown) may be coupled to the metal flange 838. Each of the metal support weldments can support a corresponding one of the support legs 840.

As described above, the perforated flame holder 102 can include a plurality of tiles 807. Each tile 807 may be about six inches by six inches in size and about two inches thick. Each tile 807 may include a plurality of elongated apertures passing through the tile 807 from the input face to the output face, the apertures being formed at a density of 90 elongated apertures per square inch at the input face and the output face, and the elongated apertures forming about 50% of the tile volume. For example, the elongated apertures may form 51% of the tile volume (0.51 void fraction).

According to an embodiment, each tile 807 can include a reticulated ceramic tile.

The fuel system may include a plurality of risers 846 parallel to the plurality of support legs 840. Each riser 846 supports a fuel nozzle 818 having a tapered tip. The parallel arrangement of the risers 846 and the support legs 840 can minimize any formation of vortices below the tips of the fuel nozzles 818 and below the perforated flame holder 102. Minimizing vortices can aid in preventing flashback from the perforated flame holder 102 toward the tips of the fuel nozzles 818. According to an embodiment, there are eight fuel nozzles 818 in a ring. In other embodiments, the number of fuel nozzles 818 may be reduced and spaced out to reduce cross-lighting below the perforated flame holder 102.

FIG. 9A is an illustration of a combustion system 900, according to an embodiment. The combustion system 900 includes a flame holder assembly 904 positioned in a furnace volume 906. The flame holder assembly 904 includes a plurality of perforated flame holders 102a, 102b arranged in an array. The array of perforated flame holders 102a, 102b includes a first group of perforated flame holders 102a at a top of the flame holder assembly 904 and oriented with respective input faces facing the floor 950 of the furnace. The array of perforated flame holders 102a, 102b includes a second group of perforated flame holders 102b each positioned substantially perpendicular to a primary direction of the fuel stream (see fuel oxidant stream 206 in FIG. 9C) and collectively arranged around the fuel stream 206. The perforated flame holders 102a, 102b are spaced apart from each other by gaps 105.

According to an embodiment, the perforated flame holders 102 can each include a porous ceramic tile. Each porous ceramic tile can be a reticulated ceramic tile. Alternatively, according to an embodiment, the perforated flame holders 102 each include a first face, a second face, and a plurality of perforations extending between the first face and the second face.

Though not illustrated in FIGS. 9A-9D, the flame holder assembly 904 can include a ceramic support structure supporting the perforated flame holders 102a, 102b in the position shown in FIGS. 9A-9D.

According to an embodiment, the combustion system 900 includes a throat insert 952 positioned in a furnace floor 950. The throat insert 952 defines an aperture 948. The throat insert 952 can be placed in a larger aperture 953 in the furnace floor 950 to effectively reduce the diameter of the larger aperture 953.

According to an embodiment, the throat insert 952 can be placed in a furnace wall other than the furnace floor 950. For example, in a horizontal burner the orientation of the combustion system 900 could be rotated 90 degrees from what is shown in FIGS. 9A-9D such that the throat insert 952 would be placed in a vertical wall of the furnace. Thus, the throat insert 952 can be placed in walls of the furnace other than the floor 950, depending on the orientation of the combustion system 900.

According to an embodiment, the combustion system 900 includes a plurality of fuel nozzles 918 positioned in the furnace volume 906 and coupled to fuel risers 946 that protrude through the aperture 948. According to an embodiment, the combustion system 900 also includes a preheating fuel nozzle 954 positioned on a preheating fuel riser 955 protruding through the aperture 948. According to an embodiment, a preheating flame holder protrudes through the aperture.

According to an embodiment, the combustion system 900 can include a barrel register 956 including one or more apertures 957 configured to introduce an oxidant into the furnace volume 906 through the aperture 948 of the throat insert 952.

Figure 9B:
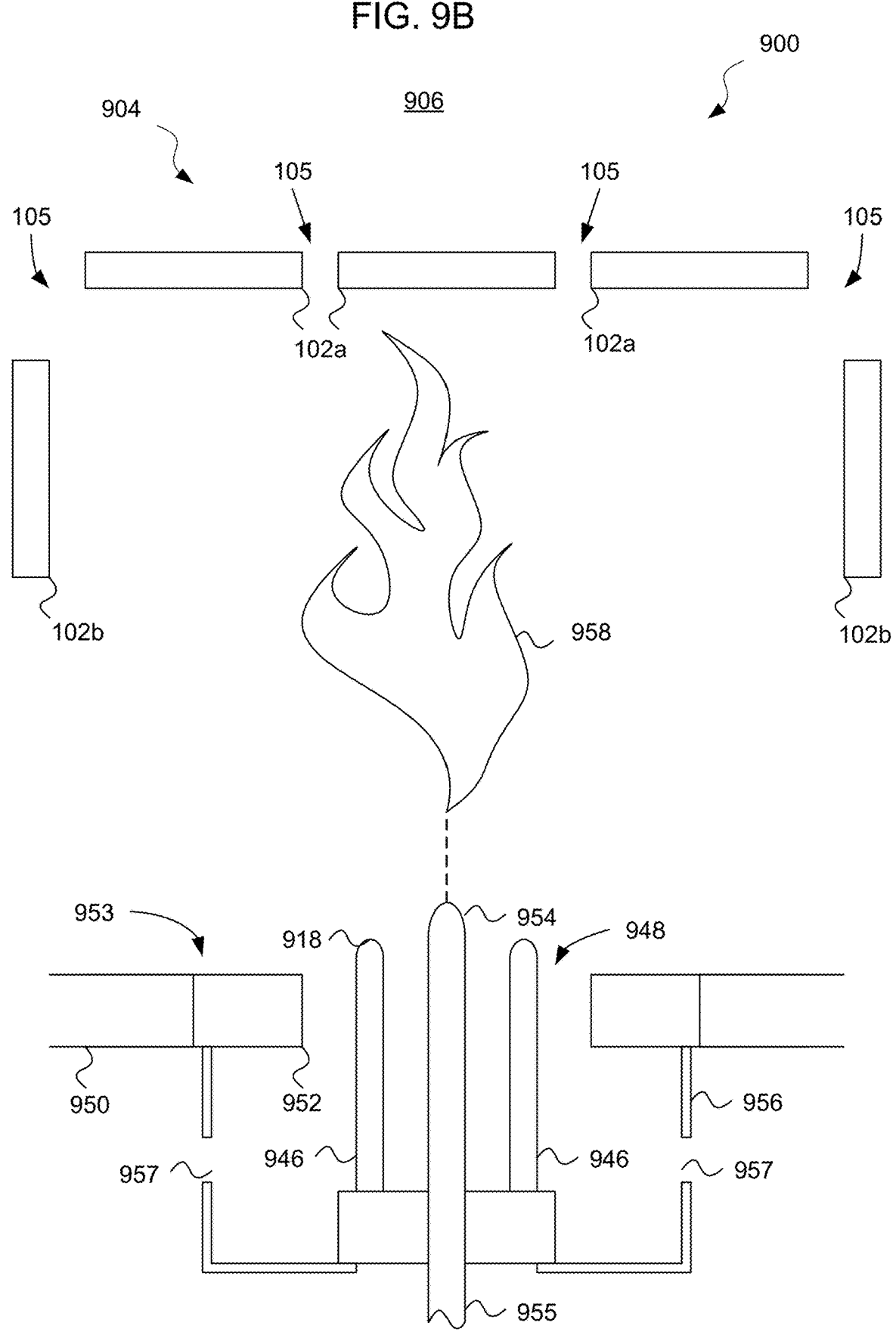
FIG. 9B is an illustration of the combustion system of FIG. 9A in a preheating state, according to an embodiment.

FIG. 9B is an illustration of the combustion system 900 in a preheating state. In the preheating state, the preheating fuel nozzle 954 supports a preheating flame 958. The preheating flame 958 extends near the porous perforated flame holders 102a, 102b. The preheating flame 958 heats the perforated flame holders 102a, 102b. When the preheating flame 958 has heated the perforated flame holders 102a, 102b to a threshold temperature, the preheating flame 958 is extinguished and the combustion system 900 enters a standard operating state.

FIG. 9C is an illustration of the combustion system 900 in a standard operating state. In the standard operating state, the fuel nozzles 918 output fuel streams 206 onto the perforated flame holders 102a of the flame holder assembly 904. Additionally, some of the fuel and oxidant 206 diverges to the perforated flame holders 102b. The perforated flame holders 102a, 102b hold a combustion reaction 535 of the fuel and oxidant 206 within, between, upstream, and downstream of the perforated flame holders 102a, 102b. Thus, a portion of the combustion reaction 535 can take place in the gaps 105 between the perforated flame holders 102a, 102b.

According to an embodiment, the perforated flame holders 102a, 102b sustain combustion reactions 535 of the fuel and oxidant 206 primarily within the perforated flame holders 102a, 102b.

According to an embodiment, the preheating flame 958 can act as a pilot flame for the fuel streams 206, in which fuel is output from all fuel nozzles 918 at once.

FIG. 9D is an enlarged view of a portion of the combustion system 900 of FIGS. 9A-9C in the standard operating state, according to an embodiment. The enlarged view of FIG. 9D illustrates some of the effect that the throat insert 952 has on the combustion system 900.

According to an embodiment, the barrel register 956 introduces an oxidant 959 through the apertures 957. The oxidant 959 then passes through the aperture 948 of the throat insert 952 and into the combustion volume 906.

According to an embodiment, the velocity of the oxidant 959 increases as the oxidant 959 passes through the aperture 948 into the furnace volume 906. The increase in velocity is due to the fact that the throat insert 952 defines an aperture 948 that has a lower cross sectional area for fluid flow than other non-pressurized portions of the air delivery system. The oxidant 959 enters a relatively wide space defined by the barrel register 956 and then is passed through the narrow aperture 948 of the throat insert 952. Thus, the velocity of the oxidant 959 is increased as the oxidant 959 passes through the narrow aperture 948.

According to an embodiment, the increase in the velocity of the oxidant 959 can have several benefits. As the oxidant 959 enters into the combustion volume 906, the oxidant 959 passes by the fuel risers 946 at high velocity. The oxidant 959 encounters the fuel streams 206 at high velocity, thereby enhancing the mixing of the fuel streams 206 and the oxidant 959. The enhanced mixing of the fuel streams 206 and the oxidant 959 can result in a cleaner burning combustion reaction 535.

According to an embodiment, the increased velocity of the oxidant 959 can also inhibit flashback of the combustion reaction 535 toward the fuel nozzles 918. This is because the increased velocity of the oxidant 959 causes a corresponding increase in the velocity of the mixture of the oxidant 959 and the fuel streams 206. The increase in the velocity of the mixture of the fuel and oxidant 206 reduces the risk of flashback toward the fuel nozzles 918.

According to an embodiment, the throat insert 952 includes a ceramic material. According to an embodiment, the throat insert 952 includes metal.

According to an embodiment, the throat insert 952 can be coupled to the support legs of the various support structures described herein.

According to an embodiment, the throat insert 952 prevents oxidant 959 from passing through the aperture 953, except through the aperture 948.

According to an embodiment, a surface of the throat insert 952 that faces the furnace volume 906 is flush with a surface of the furnace wall 950 that faces the furnace volume 906.

According to an embodiment, the aperture 948 has a circular cross-section. According to an embodiment, an outer diameter of the throat insert 952 is greater than or equal to 19 inches.

Figure 10A:
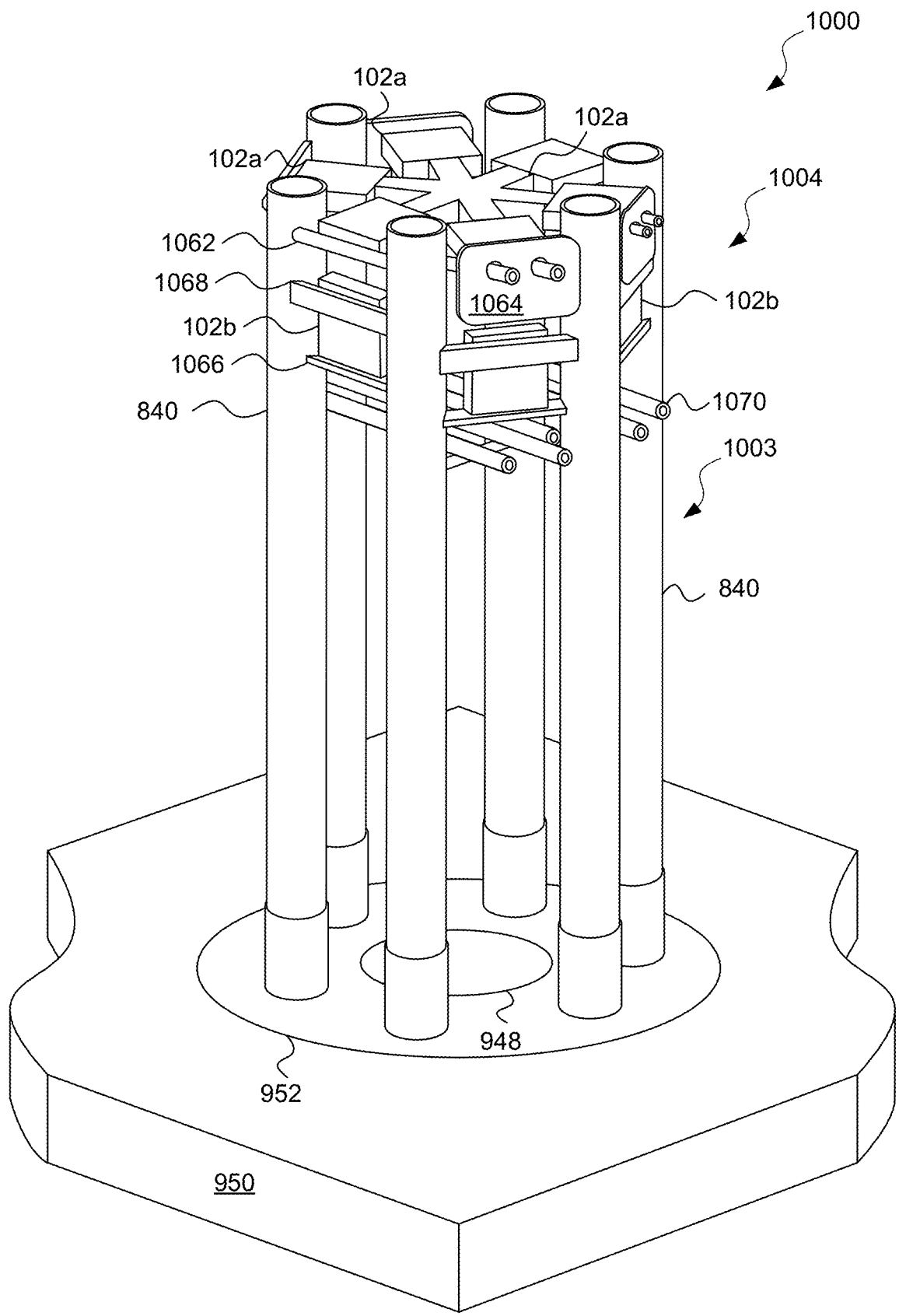
FIG. 10A is a perspective view of a combustion system including a flame holder assembly, according to an embodiment.
Figure 10B:
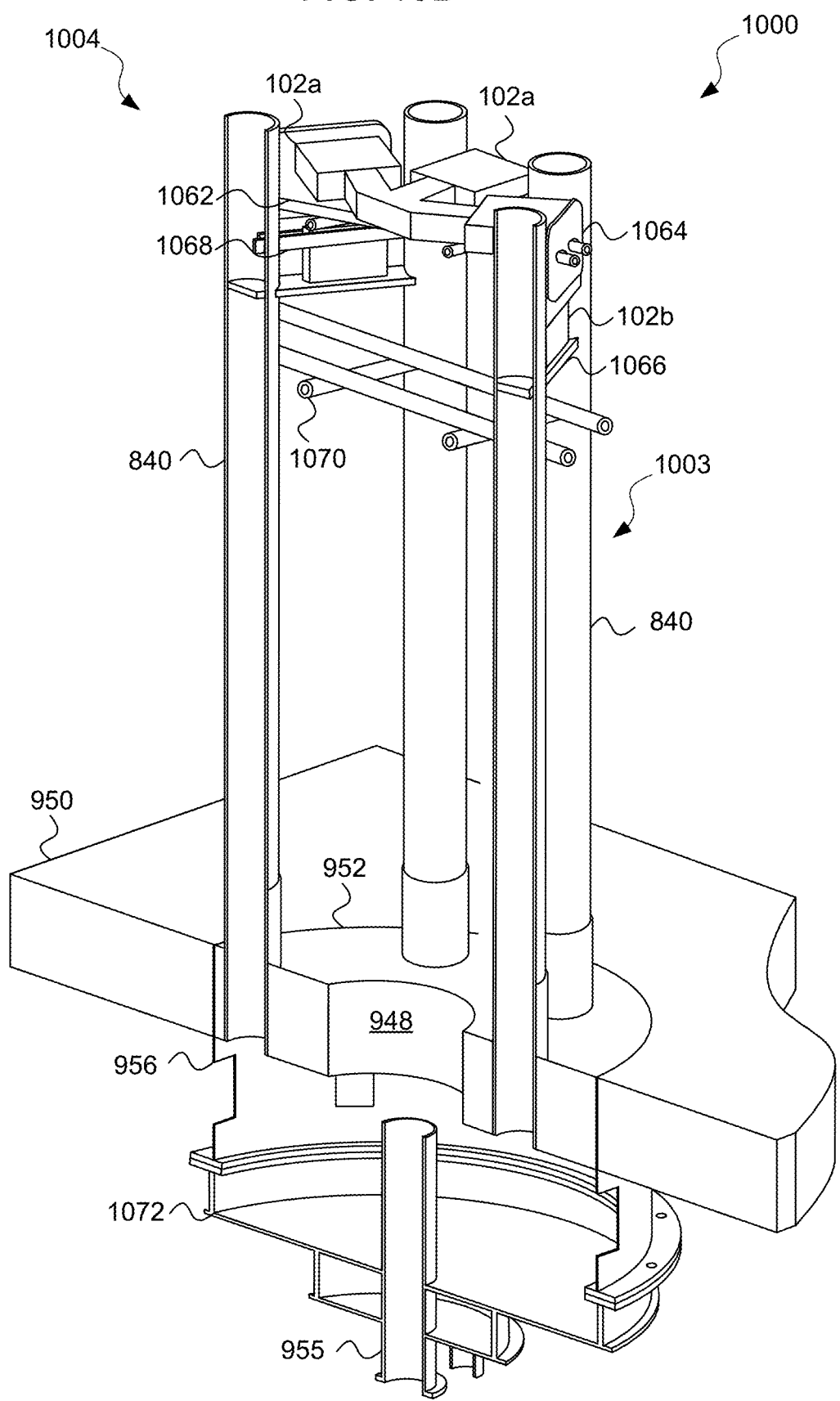
FIG. 10B is a cut-away view of the flame holder assembly of FIG. 10A, according to an embodiment.

FIGS. 10A-10C are various views of a combustion system 1000 including a flame holder assembly 1004, according to an embodiment. FIG. 10A is a perspective view of the combustion system 1000, according to an embodiment. FIG. 10B is a cut-away view of the combustion system 1000, according to an embodiment. FIG. 10C is an enlarged view of an upper portion of the flame holder assembly 1004, according to an embodiment.

With reference to FIGS. 10A-10C, the flame holder assembly 1004 includes a plurality of perforated flame holders 102a, 102b supported by a ceramic support structure 1003. Though not shown in FIGS. 10A-10C, the combustion system 1000 includes one or more fuel nozzles configured to emit a fuel stream from a position near a furnace floor 950 onto the plurality of perforated flame holders 102a, 102b.

According to an embodiment, the array of flame holder assembly 1004 includes a first group of porous tiles 102a arranged in a plane transverse to a direction of flow of the fuel stream 206. The first group of perforated flame holders 102a includes six rectangular tiles 102a and a central star-shaped perforated flame holder 102a each positioned near the top of the flame holder assembly 1004 and lying in a plane that is parallel to the floor 950 of the furnace.

According to an embodiment, the flame holder assembly 1004 includes a second group of perforated flame holders 102b positioned below the first group of perforated flame holders 102a. The second group of perforated flame holders 102b includes six perforated flame holders 102b arranged substantially parallel to the primary direction of the fuel stream 206 and positioned to surround the fuel stream 206 as the fuel stream 206 approaches the first group of perforated flame holders 102a.

According to an embodiment, the perforated flame holders 102 can be porous ceramic tiles, such as reticulated ceramic tiles. According to an embodiment, the reticulated ceramic tiles include zirconia. According to an embodiment, the reticulated ceramic tiles include silicon carbide. According to an embodiment, the reticulated ceramic tiles include about 10 pores per square inch of surface area.

According to an embodiment, each perforated flame holder 102 can include an input face, an output face, and a plurality of perforations 210 that each extend between the input face and the output face. According to an embodiment, the perforated flame holders 102 can include a ceramic material such as zirconia or silicon carbide.

According to an embodiment, the ceramic support structure 1003 can include a ceramic material. According to an embodiment, the ceramic support structure 1003 can be entirely ceramic. According to an embodiment, the ceramic support structure 1003 can include silicon carbide.

According to an embodiment, the ceramic support structure 1003 can include a plurality of support legs 840. The support legs 840 can be mounted on or coupled to a barrel register 956. Alternatively, the support legs 840 can be mounted on or coupled to another suitable structure.

According to an embodiment, the support legs 840 can include hollow cylinders. According to an embodiment, the support legs 840 can extend 40"-50" above the floor 950 of the furnace. According to an embodiment, the support legs 840 have a diameter of about 2½ inches. Those of skill in the art will understand, in light of the present disclosure, that the support legs 840 can include dimensions, materials, and shapes other than those shown in the figures and described herein. All such other shapes, materials, and dimensions fall within the scope of the present disclosure.

According to an embodiment, the ceramic support structure 1003 includes a plurality of support rods 1062 configured to support the first group of perforated flame holders 102a near the top of the flame holder assembly 1004. The first group of perforated flame holders 102a rest on top of the support rods 1062. The support rods 1062 can include grooves, notches, or slots configured to stably accommodate the perforated flame holders 102a of the first group. Thus, according to an embodiment, the perforated flame holders 102a of the first group can be stably supported on the support rods 1062 without the need of cement or other implements for fixing the perforated flame holders 102a of the first group to the support rods 1062.

According to an embodiment, the support rods 1062 extend in a direction transverse to an axis of the fuel nozzle 918. In other words, if the support legs 840 extend vertically from the floor 950 of the furnace, then the support rods 1062 extend in directions horizontal to the floor 950 of the furnace. According to an embodiment, one or more of the support rods 1062 can extend in a direction perpendicular to other of the support rods 1062 while still extending parallel to the floor 950 of the furnace.

According to an embodiment, the support rods 1062 can be coupled to and supported by the support legs 840. In particular, the support legs 840 can include grooves, slots, holes, or notches in which the support rods 1062 can rest and be supported by the support legs 840. According to an embodiment, the support rods 1062 can be supported by and stably coupled to the support legs 840 the via the grooves, slots, holes, or notches in the support legs 840 without the need of cement or other implementations for fixing the support rods 1062 to the support legs 840. The support rods 1062 can also include additional flame holding mechanisms.

According to an embodiment, the ceramic support structure 1003 includes a plurality of end plates 1064 configured to couple to the end portions of the support rods 1062. The end plates 1064 can include apertures through which the end portions of the support rods 1062 can extend. The end portions of the support rods 1062 can include notches that can stably accommodate the end plates 1064.

According to an embodiment, the ceramic support structure 1003 can include a plurality of first slats 1066 each extending between two adjacent support legs 840. Each first slat 1066 supports a perforated flame holder 102b of the second group of perforated flame holders 102. In particular, each perforated flame holder 102b of the second group sits vertically on a first slat 1066.

According to an embodiment, the support legs 840 can include additional notches, slots, groups, or holes to support and hold the first slats 1066. According to an embodiment, two or more of the first slats 1066 are vertically offset relative to each other so that respective portions of the two first slats 1066 that extend into an interior of a same support leg 840 will not interfere with each other. In other words, the vertical offset of the two first slats 1066 can enable accommodation of end portions of the first slats 1066 within a same support leg 840.

According to an embodiment, the ceramic support structure 1003 can include a plurality of second slats 1068 arranged in pairs. Each pair of second slats 1068 is positioned to support and restrain a respective perforated flame holder 102b of the second group of perforated flame holders 102. The second slats 1068 each extend between two adjacent support legs 840. The support legs 840 can include holes, notches, grooves, or slots to stably couple with the second slats 1068. The second slats 1068 can also include notches or grooves to enable stable coupling with the support legs 840.

According to an embodiment, each pair of second slats 1068 is positioned near an upper end of a respective perforated flame holder 102b of the second group of perforated flame holders 102. One second slat 1068 of a pair is positioned between the perforated flame holder 102b and the fuel stream 206. The other second slat 1068 of the pair is positioned on an opposite side of the perforated flame holder 102b so that the perforated flame holder 102b cannot fall off of the first slat 1066 in either direction.

According to an embodiment, the first and second slats 1066, 1068 can include silicon carbide.

According to an embodiment, the ceramic support structure 1003 includes an array of second rods 1070 positioned between the perforated flame holders 102b and the fuel nozzle 918. The plurality of second rods 1070 extend transverse to a direction of the fuel stream 206 and parallel to the furnace floor 950. The second rods 1070 can be arranged in a crisscrossing fashion, and/or parallel to the aforementioned support rods 1062 in either an aligned or staggered arrangement.

According to an embodiment, the second rods 1070 are positioned to cause the fuel stream 206 to flow around the second rods 1070 as the fuel stream 206 travels toward the first group of perforated flame holders 102a. The second rods 1070 disturb the fuel stream 206 and create a bluff body effect that can enhance stability of a combustion reaction of the fuel and oxidant mixture 206 and provide a secondary stabilization mechanism. The bluff body effect can also reduce flashback toward the fuel nozzle 918.

According to an embodiment, the second rods 1070 have a round cross-section. Alternatively, the second rods 1070 can have other cross sections, such as rectangular cross-sections, hexagonal cross-sections, tapered cross-sections, etc. According to an embodiment, the second rods 1070 have a diameter of about three quarters of an inch. Those of skill in the art will recognize, in light of the present disclosure, that the second rods 1070 can have other shapes, dimensions, and orientations other than those described herein. All such other shapes dimensions and orientations fall within the scope of the present disclosure.

According to an embodiment, the combustion system 1000 includes a barrel register 956 positioned below the floor 950 of the furnace. The barrel register 956 is an oxidant source that emits oxidant into the combustion environment via the aperture 948. The barrel register 956 can include two concentric cylinders each having apertures 948. The more the apertures 948 of the two concentric cylinders are aligned, the higher the flow rate of the oxidant into the combustion environment. The barrel register 956, as shown, includes rectangular apertures 948.

According to an embodiment, the combustion system 1000 can include a throat insert 952. In particular, the furnace floor 950 may have a relatively large aperture 948 for the input of fuel and oxidant mixture 206 into the combustion environment. The throat insert 952 is configured to be positioned within the aperture 948 in the floor 950. The throat insert 952 includes its own aperture 948 that is smaller in diameter than the original aperture 948 in the floor 950 in which the throat insert 952 is positioned. Thus, the throat insert 952 has the effect of reducing the size of an aperture 948 in the furnace floor 950 through which a fuel and oxidant mixture 206 is introduced into the combustion environment. The reduced size of the aperture 948 relative to an original aperture 948 in the floor 950 constricts an area through which the fuel and oxidant mixture 206 flow into the furnace volume 106. Given a particular mass flow rate of fuel and oxidant mixture 206, an aperture 948 of smaller cross-sectional area will cause an increase in the velocity of the fuel and oxidant mixture 206 compared to an aperture 948 of larger cross-sectional area. The increased velocity of the fuel and oxidant mixture 206 can help maintain stability of the combustion reaction 535 and avoid flashback, especially when highly reactive fuels, such as hydrogen, are used.

According to an embodiment, the throat insert 952 and aperture 948 can function substantially as described in relation to FIGS. 9A-9D. Additionally, though not shown in FIGS. 10A-10C, the combustion system 1000 can include fuel risers 946 protruding through the aperture 948 and having fuel nozzles 918 coupled thereto.

According to an embodiment, the combustion system 1000 includes a fuel manifold 1072 positioned below the barrel register 956. Though not shown in FIGS. 10A-10C, the combustion system 1000 can include a plurality of fuel nozzles 918 on risers extending up from the fuel manifold 1072. The fuel nozzles 918 receive the fuel from the fuel manifold 1072 and output fuel streams 206 through the aperture 948 toward the perforated flame holders 102a, 102b.

According to an embodiment, the fuel nozzles 918 can be positioned within the aperture 948. According to an embodiment, the fuel nozzles 918 can be positioned below the aperture 948. According to an embodiment, the fuel nozzles 918 can extend through the aperture 948.

According to an embodiment, the combustion system 1000 includes preheating fuel riser 955, only partially shown in FIG. 10B, configured to preheat the perforated flame holders 102a, 102b of the flame holder assembly 1004 to a threshold temperature at which the perforated flame holders 102a, 102b can support a combustion reaction 535 of the fuel and oxidant mixture 206. The preheating fuel riser 955 is configured to support a startup flame by providing fuel to a preheating fuel nozzle 954 that is configured to output the preheating fuel and to sustain a preheating flame. The preheating flame can heat the perforated flame holders 102a, 102b of the flame holder assembly 1004 to the threshold temperature. The threshold temperature corresponds to a temperature at which the perforated flame holders 102a, 102b can support a combustion reaction 535 of the oxidant and fuel mixture 206. The preheating fuel riser 955 can protrude through the aperture 948.

According to an embodiment, after the perforated flame holders 102a, 102b have been heated to the threshold temperature, the preheating fuel riser 955 extinguishes the preheating flame. The fuel nozzles 918 then proceed to output one or more fuel streams 206 toward the perforated flame holders 102a, 102b. The fuel stream 206 travels toward the first group of perforated flame holders 102a and impinges directly on the first group of perforated flame holders 102a. According to an embodiment, the second group of perforated flame holders 102b is arranged surrounding the fuel stream 206 as it travels toward the first group of perforated flame holders 102a. Each perforated flame holder 102b of the second group is arranged parallel to the primary direction of travel of the fuel stream 206.

According to an embodiment, the perforated flame holders 102b of the second group are arranged to catch any unburned reactants traveling radially out from under the first group of perforated flame holders 102a. The perforated flame holders 102b of the second group can operate to bind the reactant jet spread. This can enable placing the first group of perforated flame holders 102a at a greater distance from the fuel nozzle 918.

According to an embodiment, placing the first group of perforated flame holders 102a at a greater distance from the fuel nozzle 918 can enable the use of fuels that burn at hotter temperatures and react more energetically.

According to an embodiment, the fuel includes hydrogen. The arrangement of the first and second groups of perforated flame holders 102a, 102b can enable the use of a relatively hot burning fuel such as hydrogen. According to an embodiment, the fuel includes a refinery gas, a mixture of hydrogen and natural gas, or other suitable fuels.

According to an embodiment, the arrangement of the first group of perforated flame holders 102a, the second group of perforated flame holders 102b, and the second rods 1070 forms a zone of elevated temperature in the volume between the perforated flame holders 102a, 102b of the first and second groups and the second rods 1070. The bulk of the combustion reaction 535 of the fuel and oxidant mixture 206 can occur in this zone of elevated temperature between the perforated flame holders 102a, 102b of the first and second groups. The zone of elevated temperature can also provide enhanced stability of the combustion reaction 535.

According to an embodiment, the perforated flame holders 102a, 102b are separated from each other by gaps 105. The first group of perforated flame holders 102a are separated from each other by gaps 105. The perforated flame holders 102b of the second group are separated from each other by gaps 105. The first group of perforated flame holders 102a are separated from the perforated flame holders 102b of the second group by gaps 105.

According to an embodiment, the star-shaped perforated flame holder 102a of the first group of perforated flame holders 102a includes gaps 1069 between the arms of the star-shaped perforated flame holder 102a. The star-shaped perforated flame holder 102a can include a previously disc-shaped perforated flame holder 102a cut by water jets into the star-shaped tile 102a, according to an embodiment. According to an embodiment, the central star-shaped tile 102a can include other shapes with gaps 1069 formed therein. According to an embodiment, any of the perforated flame holders 102a, 102b can include gaps 1069 formed therein.

According to an embodiment, the gaps between the perforated flame holders 102a can affect a global pressure drop of the combustion system 1000. The spacing between the perforated flame holders 102a, 102b can be modified based on operating conditions such as fuel composition, firing capacity, etc. For example, natural gas fuels may require smaller gaps 105 between the perforated flame holders 102a, 102b than do hydrogen blends. Additionally, colder furnace temperatures may require smaller gaps 105 between the perforated flame holders 102a, 102b than hotter furnaces. The relative spacing between the perforated flame holders 102a, 102b can be selected based on various conditions of the combustion system 1000.

According to an embodiment, the combustion reaction 535 of the fuel and oxidant mixture 206 is held between, upstream, downstream, and within the perforated flame holders 102a, 102b. In an alternative embodiment, the combustion reaction 535 of the fuel and oxidant mixture 206 can be held primarily within the perforated flame holders 102a, 102b.

While some embodiments of configurations, dimensions, shapes, materials, components and positioning have been described above for the combustion system 1000, those of skill in the art will recognize, in light of the present disclosure that many other shapes, dimensions, configurations, materials, positioning, and components can be implemented in a combustion system 1000, and in particular, for the flame holder assembly 1004. All such other shapes, dimensions, configurations, materials, and positioning fall within the scope of the present disclosure. Furthermore, those of skill in the art will recognize, in light of the present disclosure, that different components and variations of the components described above can be used for a combustion system 1000 in accordance with principles of the present disclosure. All such other components and variations of components fall within the scope of the present disclosure.

Figure 11A:
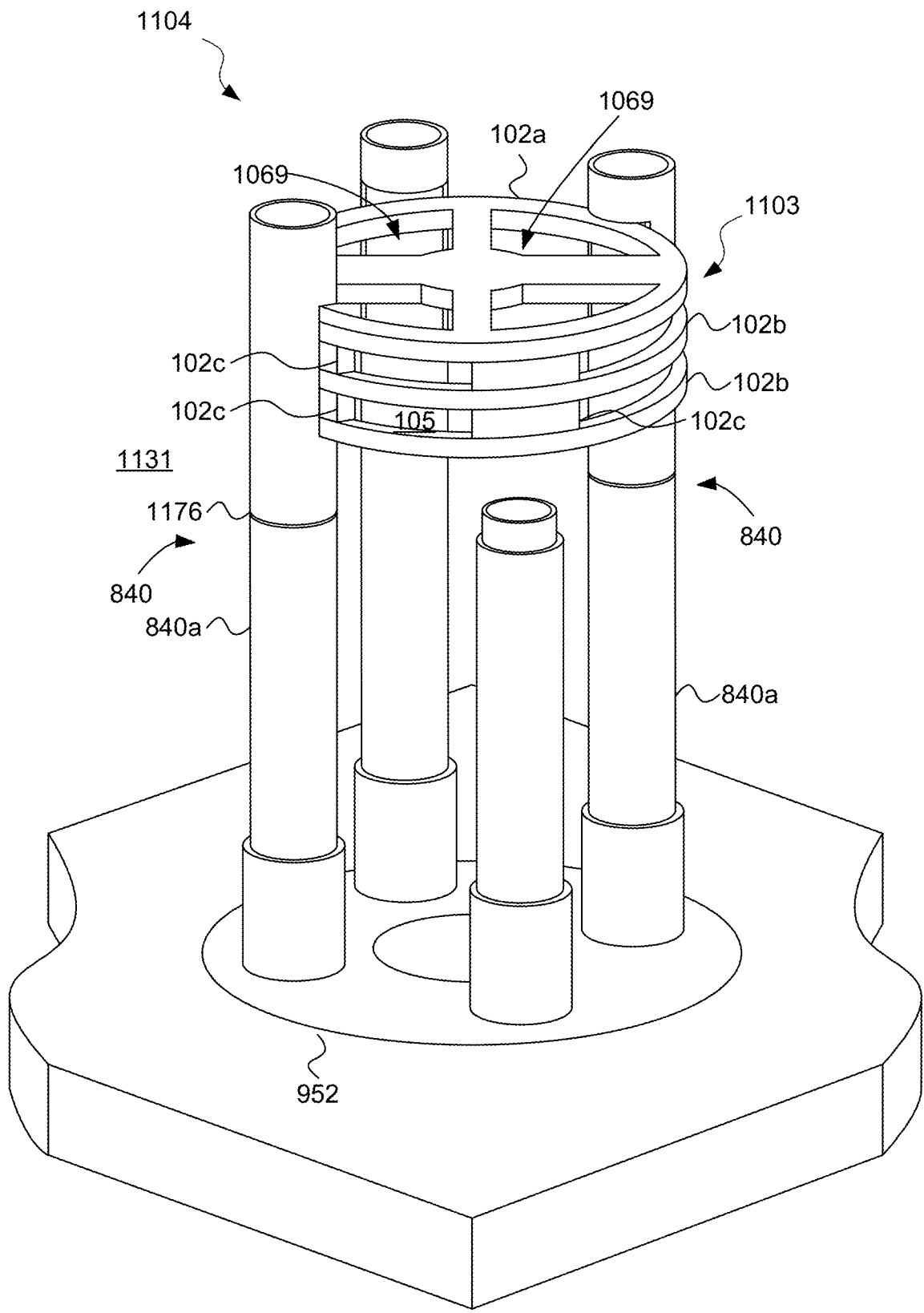
FIG. 11A is a diagram of a combustion system including a flame holder assembly, according to an embodiment.

FIG. 11A is a diagram of a flame holder assembly 1104, according to an embodiment. The flame holder assembly 1104 includes a perforated flame holder 102a at the top of the flame holder assembly 1104 that includes a disk shape with holes or gaps 1069 formed therein. The flame holder assembly 1104 includes ring shaped perforated flame holders 102b positioned below the top perforated flame holder 102a. The flame holder assembly 1104 also includes perforated flame holders 102c positioned between the ring shaped perforated flame holders 102b.

According to an embodiment, the flame holder assembly 1104 further includes a ceramic support structure 1103 configured to hold the porous ceramic tiles 102a-102c. The ceramic support structure 1103 includes support legs 840 each including a lower support leg segment 840a and an upper support leg segment 840b coupled together at a joint 1176. The perforated flame holders 102a, 102b, and 102c are coupled to the support legs 840. In particular, the perforated flame holders 102a-102c can be positioned within a slot 1178 formed within one or more of the support legs 840.

According to an embodiment, the perforated flame holders 102a-102c can each include a porous ceramic tile. According to an embodiment each porous ceramic tile can include a reticulated ceramic tile. Alternatively, according to an embodiment, the perforated flame holders 102a-102c each include a first face, a second face, and a plurality of perforations 210 extending between the first face and the second face.

According to an embodiment, all of the perforated flame holders 102a-102c are configured to hold a combustion reaction 535 of a fuel and oxidant mixture 206.

According to an embodiment, the support legs 840 can include multiple support leg portions 840a, 840b coupled together by a joint 1076. This enables the flame holder assembly 1104 to adjust the height of the perforated flame holders 102a-102c above the fuel nozzle 918. If a shorter distance between the perforated flame holders 102a-102c and the fuel nozzle 918 is desired, then lower support leg segment 840a can be detached from the upper support leg segment 840b at the joint 1076 and removed. If a larger distance between the perforated flame holders 102a-102c and the fuel nozzle 918 is desired, then an extra support leg segment can be added to extend the support legs 840. According to an embodiment, there can be multiple joints 1076 for three or more support leg portions 840a, 840b. According to an embodiment, the ceramic support structure 1103 can be made entirely of ceramic materials. In one example, the ceramic support structure 1103 can include silicon carbide.

According to an embodiment, the perforated flame holders 102a-102c can include a reticulated ceramic. According to an embodiment, the perforated flame holders 102a-102c can include zirconia.

According to an embodiment, the perforated flame holders 102a-102c are perforated flame holders 102. Each perforated flame holder can include an input surface, an output surface, and a plurality of perforations 210 extending between the input surface and the output surface.

According to an embodiment, the perforated flame holders 102a-102c are configured to hold a combustion reaction 535 of the fuel and the oxidant mixture 206 within, between, upstream, and downstream of the perforated flame holders 102a-102c.

Figure 11B:
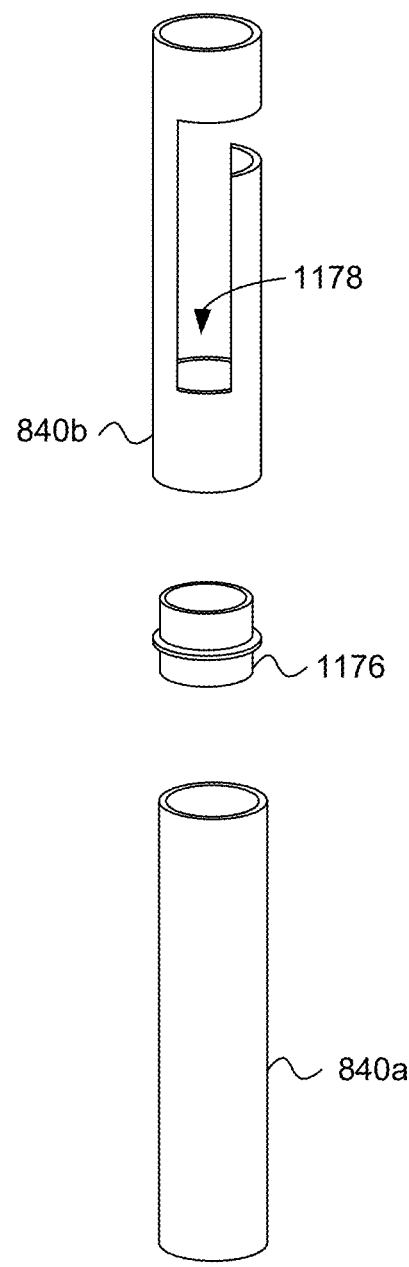
FIG. 11B is an exploded view of a support leg of the flame holder assembly of FIG. 11A, according to an embodiment.

FIG. 11B is an exploded view of the support leg 840 of the ceramic support structure 1103 of the flame holder assembly 1104. The support leg 840 includes two support leg portions 840b, 840a coupled together by a joint 1076. The top support leg portion 840b includes a slot 1078 for supporting the perforated flame holders 102a-102c.

Figure 12A:
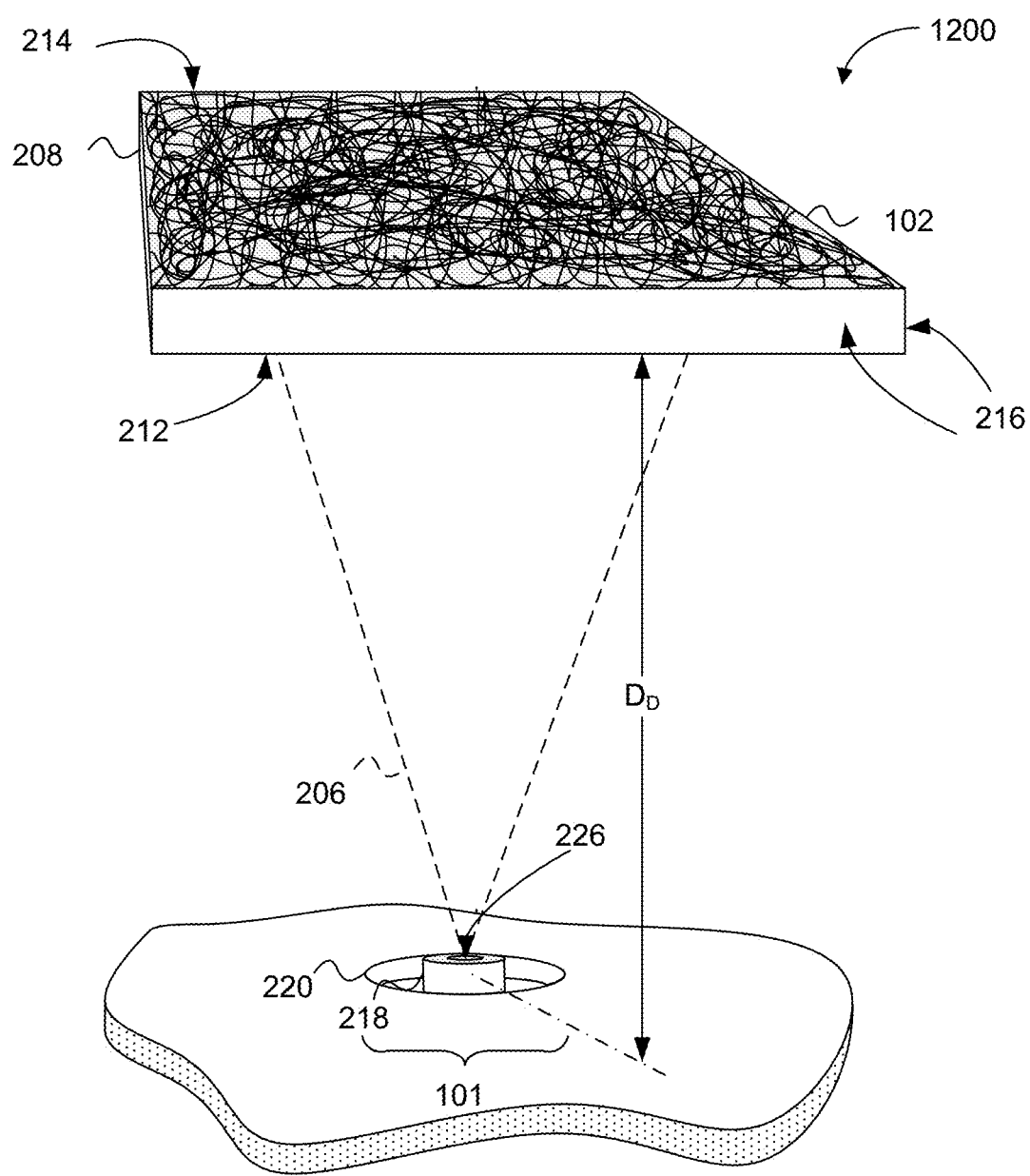
FIG. 12A is a simplified diagram of a burner system, including a perforated flame holder configured to hold a combustion reaction, according to an embodiment.
Figure 12B:
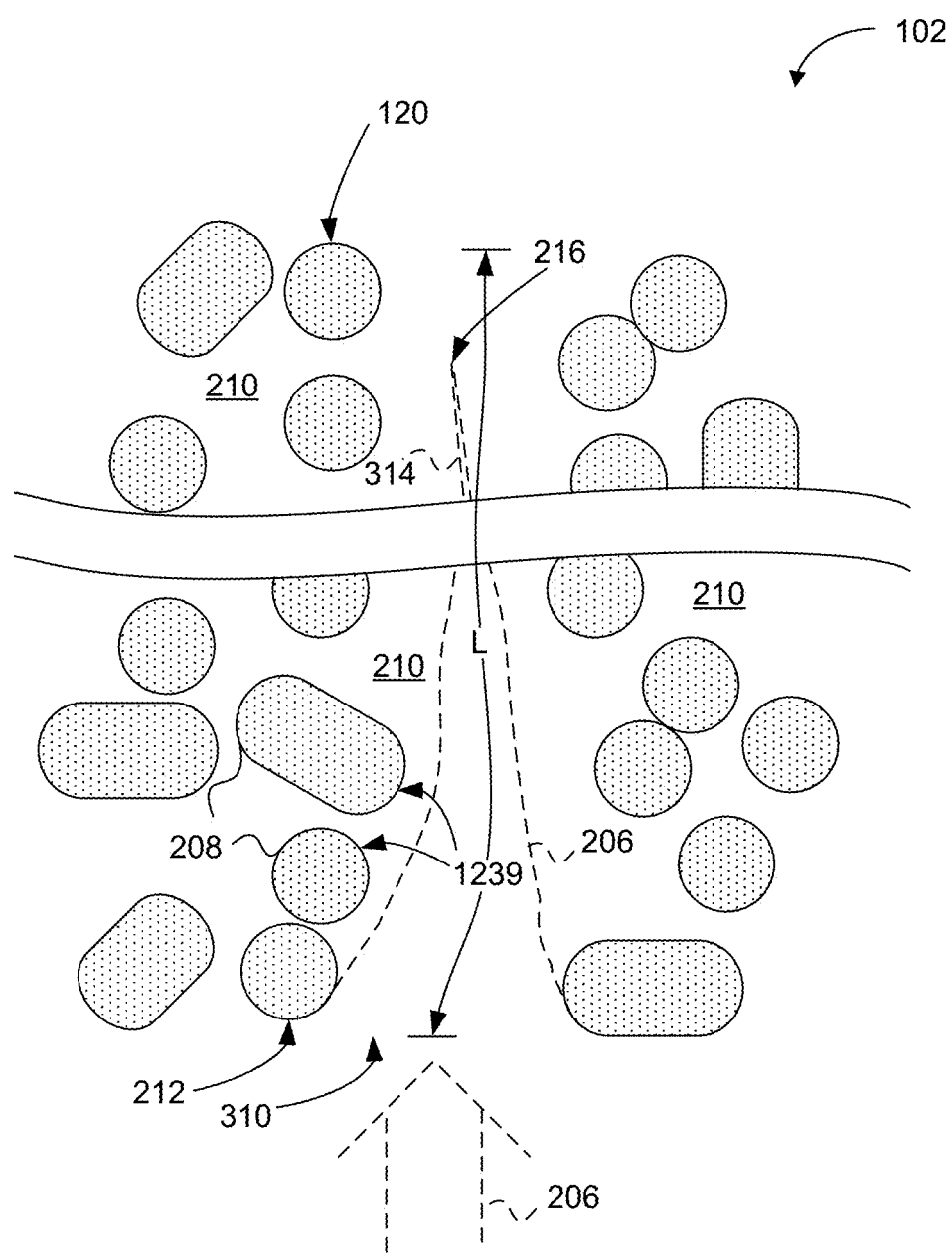
FIG. 12B is a side sectional diagram of a portion of the perforated flame holder of FIG. 12A, according to an embodiment.

FIG. 12A is a simplified perspective view of a combustion system of 1200, including another alternative perforated flame holder 102, according to an embodiment. The perforated flame holder 102 is a porous ceramic tile. In particular, the perforated flame holder 102 of FIG. 12A is a reticulated ceramic perforated flame holder 102 including a discontinuous perforated flame holder body 208 with branching perforations, according to an embodiment. FIG. 12B is a simplified side sectional diagram of a portion of the perforated flame holder 102 of FIG. 12B, according to an embodiment. The reticulated ceramic perforated flame holder 102 of FIG. 12A, 12B can be implemented in the various combustion systems described herein, according to an embodiment.

Referring to FIGS. 12A and 12B, the perforated flame holder body 208 can be discontinuous. The perforated flame holder body 208 can define perforations 210 that branch from one another. The perforated flame holder body 208 can include stacked sheets of material, each sheet having openings non-registered to the openings of a subjacent or superjacent sheet. "Non-registered" openings (described below) refer to openings that cause branching of oxidation fluid flow paths. "Non-registered" openings may, in fact, correspond to patterns that have preplanned differences in location from one another. "Registered" openings, which cause the perforations 210 to be separated from one another. may also have preplanned differences in location from one sheet to another (or may be superpositioned to one another) but "registered" openings do not cause branching, and hence the perforations 210 are separated from one another.

According to an embodiment, the perforated flame holder body 208 can include fibers 1239 including reticulated fibers. The fibers 1239 can define branching perforations 208 that weave around and through the fibers 1239.

The fibers 1239 can include an alumina silicate. For example, the fibers 1239 can be formed from extruded mullite or cordierite. In another embodiment, the fibers 1239 can include a metal. For example, the fibers 1239 can include stainless steel and/or a metal superalloy.

The term "reticulated fibers" refers to a netlike structure. According to an embodiment, the fibers 1239 are formed from an extruded ceramic material. In reticulated fiber embodiments, the interaction between the fuel and oxidant, the combustion reaction, and heat transfer to and from the perforated flame holder body 208 functions similarly to the embodiment shown and described above with respect to FIGS. 2-4. One difference in activity is a mixing between perforations 210, because the fibers 1239 form a discontinuous perforated flame holder body 208 that allows flow back and forth between neighboring perforations 210.

According to an embodiment, the network of reticulated fibers 1239 is sufficiently open for downstream fibers 1239 to emit radiation for receipt by upstream fibers 1239 for the purpose of heating the upstream fibers 1239 sufficiently to maintain combustion of a lean fuel and oxidant mixture 206.

Compared to a continuous perforated flame holder body 208, heat conduction paths 312 between fibers 1239 are reduced owing to separation of the fibers 1239. This may cause relatively more heat to be transferred from the heat-receiving region 210 (heat receiving area) to the heat-output region 212 (heat output area) of the perforation wall 204 via thermal radiation.

According to an embodiment, the reticulated ceramic perforated flame holder 102 includes Zirconia. According to an embodiment, the reticulated ceramic perforated flame holder 102 is about 1"×4"×4". According to an embodiment, the reticulated ceramic perforated flame holder 102 includes about 100 pores per square inch of surface area. Other materials and dimensions can also be used for a reticulated ceramic perforated flame holder 102 in accordance with principles of the present disclosure.

Figure 13:
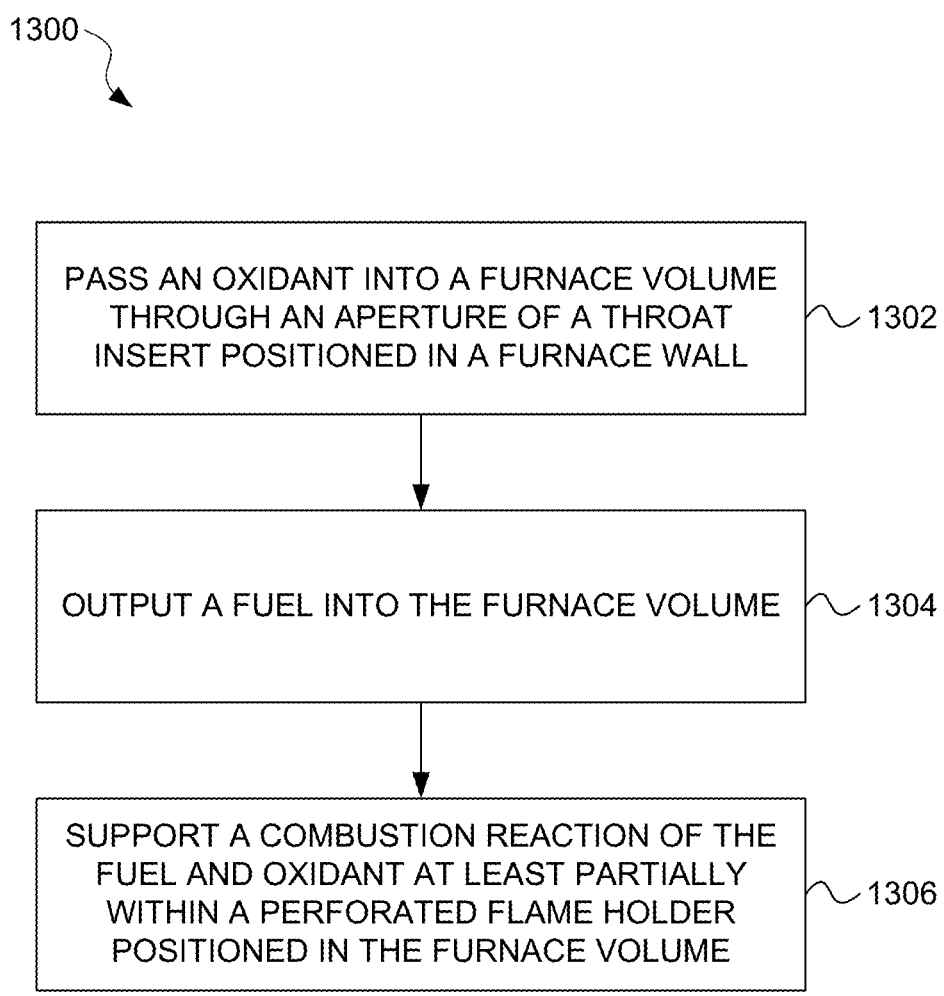
FIG. 13 is a flow diagram of a process for operating a combustion system, according to an embodiment.

FIG. 13 is a flow diagram of a method 1300 for operating a combustion system, according to an embodiment. At 1302 and oxidant is passed into a furnace volume through an aperture of a throat insert positioned in a furnace wall. At 1304 a fuel is output into the furnace volume. At 1306 a combustion reaction of the fuel and oxidant is supported at least partially within a perforated flame holder positioned in the furnace volume.

According to an embodiment, the method 1300 can also include, wherein passing the oxidant through the aperture includes increasing a velocity of the oxidant as the oxidant passes through the aperture.

According to an embodiment, the method 1300 can also include enhancing a mixing of the fuel and oxidant by increasing a velocity of the oxidant as the oxidant passes through the aperture.

According to an embodiment, the method 1300 can also include inhibiting flashback of the combustion reaction by increasing a velocity of the oxidant as the oxidant passes through the aperture.

According to an embodiment, outputting the fuel includes outputting the fuel via one or more fuel risers protruding through the aperture.

According to an embodiment, outputting the fuel includes outputting the fuel via one or more fuel nozzles each coupled to a respective fuel riser.

According to an embodiment, the method 1300 can also include preheating the perforated flame holder by supporting a preheating flame in the combustion volume prior to outputting the fuel.

According to an embodiment, supporting the preheating flame includes delivering a preheating fuel to the furnace volume via a preheating fuel riser protruding through the aperture.

According to an embodiment, the method 1300 can also include outputting the oxidant includes outputting the oxidant from a barrel register.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustion system, comprising:
  a fuel and oxidant source configured to output fuel and oxidant;
  a first flame holder positioned to receive a first portion of the fuel and oxidant and to support a first combustion reaction of the fuel and oxidant within the first flame holder;
  a second flame holder positioned to receive a second portion of the fuel and oxidant and to support a second combustion reaction of the fuel and oxidant, the first and second flame holders being separated by a gap of non-zero width; and
  a support structure supporting the first and second flame holders in a furnace volume, the support structure having a plurality of tube segments forming a single continuous tube, the first and second flame holders being positioned on the plurality of tube segments.

2. The combustion system of claim 1, wherein the plurality of tube segments each include an inner channel configured to pass a fluid therethrough.

3. The combustion system of claim 2, wherein the fluid is a cooling fluid configured to cool the first and second flame holders.

4. The combustion system of claim 1, wherein the support structure includes:
  a first support structure portion supporting the first flame holder; and
  a second support structure portion supporting the second flame holder.

5. The combustion system of claim 1, wherein the second flame holder includes at least one of multiple first flame holder tiles joined together in a first group and multiple second flame holder tiles joined together in a second group.

6. The combustion system of claim 1, wherein the gap is between one half inch and two inches.

7. The combustion system of claim 1, wherein a width of the gap is selected so that fuel and oxidant do not pass entirely through the gap due to combustion within the gap.

8. The combustion system of claim 1, including a third flame holder disposed to receive the fuel and oxidant and to support a third combustion reaction of the fuel and oxidant, the third flame holder being separated from the first flame holder by a second gap.

9. The combustion system of claim 1, wherein the fuel and oxidant source includes:
  a first fuel nozzle configured to output the fuel and oxidant onto the first flame holder; and
  a second fuel nozzle configured to output the fuel and oxidant onto the second flame holder.

10. A method of using the combustion system of claim 1, comprising:
  supporting the first flame holder and the second flame holder in a furnace volume and separated by the gap of non-zero width;
  outputting fuel and oxidant from the fuel and oxidant source onto the first and second flame holders;
  sustaining the first combustion reaction of the fuel and oxidant within the first flame holder; and
  sustaining the second combustion reaction of the fuel and oxidant within the second flame holder.

11. The method of claim 10, wherein the first flame holder includes a plurality of first flame holder tiles joined together in a first group of flame holder tiles.

12. The method of claim 11, wherein the second flame holder includes a plurality of second flame holder tiles joined together in a second group of flame holder tiles.

13. The method of claim 12, wherein the width of the gap is between one and one half inches and two inches.

14. The method of claim 10, wherein supporting the first and second flame holders includes supporting the first and second flame holders on the plurality of tube segments.

15. The method of claim 14, further comprising cooling the first and second flame holders by passing a cooling fluid through the plurality of tube segments.

16. The method of claim 14, wherein the plurality of tube segments together constitute the single continuous tube.

17. A combustion system, comprising:
a fuel and oxidant source configured to output fuel and oxidant;
a first flame holder positioned to receive a first portion of the fuel and oxidant and to support a first combustion reaction of the fuel and oxidant within the first flame holder;
a second flame holder positioned to receive a second portion of the fuel and oxidant and to support a second combustion reaction of the fuel and oxidant, the first and second flame holders being separated by a gap of non-zero width; and
a modular burner, the modular burner, comprising:
a metal flange that is configurable for attachment to a furnace wall, the metal flange having an inner surface and an outer surface, and defining a flange aperture passing through the metal flange between the inner surface and the outer surface;
a plurality of support legs, each operatively coupled to the metal flange and extending inwardly from the flange, each support leg being formed at least partially from a ceramic material, the first flame holder and the second flame holder being operatively coupled to each of the plurality of support legs such that the plurality of support legs collectively support the first flame holder and the second flame holder at respective distances from the metal flange;
a combustion air register operatively coupled to the flange and disposed adjacent to the outer surface of the flange, the combustion air register being configured to control a flow of combustion air through the flange aperture to the flame holders;
wherein the fuel and oxidant source includes a fuel delivery system including one or more fuel nozzles configured to deliver gaseous fuel toward the flame holder; and
wherein the first flame holder and the second flame holder are configured to hold a combustion reaction supported by a mixture of the gaseous fuel and the combustion air.

18. The modular burner of claim 17, wherein the plurality of support legs and the first and second flame holders are arranged to facilitate insertion of the modular burner through an aperture in a furnace wall having a diameter of 19 inches or greater.

19. The modular burner of claim 17, wherein each of the plurality of support legs is a tube.

20. The modular burner of claim 17, further comprising:
a plurality of metal support weldments coupled to the metal flange;
wherein each of the plurality of metal support weldments supports a corresponding one of the legs.

21. The modular burner of claim 17, wherein the fuel delivery system includes a plurality of risers parallel to the plurality of support legs, each riser supporting a tapered nozzle tip constituent of a fuel nozzle of the one or more fuel nozzles;
whereby the fuel delivery system and the plurality of support legs minimize any formation of vortices below the nozzle tips.

22. The modular burner of claim 17, wherein each of the first and second flame holders includes an array of flame holder tiles, and each of the one or more fuel nozzles outputs a fuel stream in a primary direction toward the tiles.

23. The modular burner of claim 22, wherein the array of flame holder tiles includes a first group of tiles arranged in a plane transverse to a primary direction of travel of the fuel stream, the first group of tiles being positioned to receive the fuel stream.

24. The modular burner of claim 23, wherein the array of flame holder tiles includes a second group of tiles arranged substantially parallel to the primary direction of the fuel stream and surrounds the fuel stream.

25. The modular burner of claim 17, wherein
the first flame holder includes a first group of tiles, and
the plurality of support legs include a plurality of first support rods configured to support the first group of tiles.

26. The modular burner of claim 25, wherein one or more of the first support rods include grooves configured to stably accommodate one or more of the tiles of the first group of tiles.

27. The modular burner of claim 23, further comprising a plurality of first slats each extending between two adjacent ones of the plurality of support legs.

28. The modular burner of claim 27, wherein the array of flame holder tiles includes a second group of tiles each positioned on and supported by a respective first slat of the plurality of first slats.

29. The modular burner of claim 28, wherein two or more of the first slats are vertically offset relative to each other, and
wherein each of the plurality of support legs includes one or more slots configured to support one or more first slats.

30. The modular burner of claim 28, further comprising a plurality of second slats arranged in pairs, each pair of second slats being coupled to one or more of the plurality of support legs and being configured to restrain a respective tile of the second group of tiles between the pair of second slats.

31. The modular burner of claim 30, wherein the plurality of support legs each include one or more second slots configured to support one or more of the plurality of second slats.

32. The modular burner of claim 30, wherein the plurality of second slats include a ceramic material.

33. The modular burner of claim 28, wherein the tiles of the second group of tiles are closer to the one or more fuel nozzles than they are to the tiles of the first group of tiles.

34. The modular burner of claim 30, further comprising an array of second rods positioned between the second group of tiles and the one or more fuel nozzles.

35. The modular burner of claim 34, wherein the second rods are positioned to interrupt the fuel stream as it travels toward the first group of tiles.

36. The modular burner of claim 22, further comprising a preheating mechanism configured to preheat the flame holder tiles to a threshold temperature at which the tiles can support a combustion reaction of fuel and oxidant.

37. The modular burner of claim 36, wherein the preheating mechanism includes a preheating fuel nozzle configured to support a startup flame.

38. The modular burner of claim 36, wherein the one or more fuel nozzles are configured to output the gaseous fuel after the flame holder tiles have been preheated to the threshold temperature.

* * * * *